United States Patent [19]

Smith

[11] Patent Number: 5,648,924
[45] Date of Patent: Jul. 15, 1997

[54] METHOD AND APPARATUS FOR FINDING ARCTANGENTS

[75] Inventor: Roger A. Smith, Austin, Tex.

[73] Assignee: Motorola, Inc., Schaumburg, Ill.

[21] Appl. No.: 424,033

[22] Filed: Apr. 18, 1995

[51] Int. Cl.$^6$ ................................................ G06F 7/548
[52] U.S. Cl. .................................................... 364/729
[58] Field of Search ............................... 364/729, 721, 364/735

[56] References Cited

U.S. PATENT DOCUMENTS

| | | | |
|---|---|---|---|
| 4,164,022 | 8/1979 | Rattlingourd et al. | 364/729 |
| 4,899,302 | 2/1990 | Nakayama | 364/729 |
| 5,222,036 | 6/1993 | Lindsley | 364/729 |
| 5,224,064 | 6/1993 | Henry et al. | 364/729 |
| 5,235,535 | 8/1993 | Nakayama | 364/729 |
| 5,305,246 | 4/1994 | Lindsley et al. | 364/729 |

FOREIGN PATENT DOCUMENTS

| | | | |
|---|---|---|---|
| 0322520 A3 | 10/1988 | European Pat. Off. | G06F 7/50 |
| 25 41 203 | 9/1975 | Germany | G06F 7/38 |

OTHER PUBLICATIONS

"High Speed Floating Point Multi-Function Generator," IBM technical disclosure bulletin vol. 31 No. 2, Armonk, NY, USA, Jul. 1988, pp. 331–334.

Shmuel Gal et al., "An Accurate Elementary Mathematical Library for the IEEE Floating Point Standard" ACM Transactions on Mathematical Software, vol. 17, No. 1, Mar. 1991, pp. 26–45.

*Primary Examiner*—David H. Malzahn
*Attorney, Agent, or Firm*—Bruce E. Hayden

[57] ABSTRACT

Arctangents ($\tan^{-1}$) are calculated utilizing binary floating point numbers through much of the function's range by extracting into an Integer Register (54) as an index ("i") the exponent and a specified number of fraction bits from a Floating Point Register(s) (60). The index is utilized by an Integer Unit (52) to index into tables of polynomial coefficients and reference values. The floating point difference between the absolute value of the argument(s) and the reference value selected by the index is a polynomial linear term. The coefficients in the table entry selected by the index are multiplied in a Floating Point Unit (58) by integral powers of the linear term. The Floating Point Unit (58) then sums the high order polynomial terms. The zero$^{th}$ level term added to the product of the first level term multiplied by the linear term forms a "big" term. The rounding error resulting from the computation of the "Big" Term is calculated as a "Small" Term, which is added to the high order polynomial terms before the Big Term is added.

30 Claims, 17 Drawing Sheets

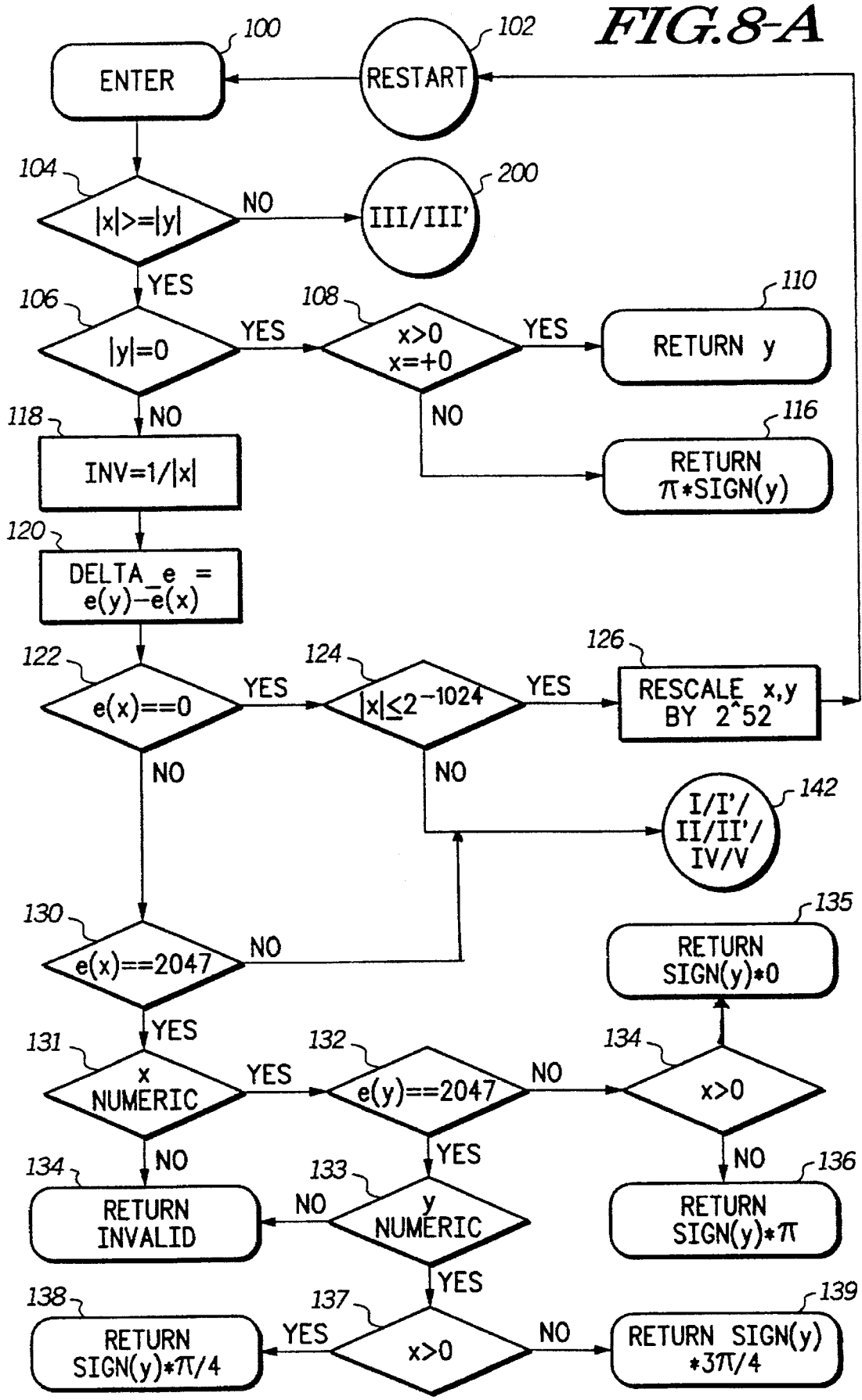
FIG.8-A

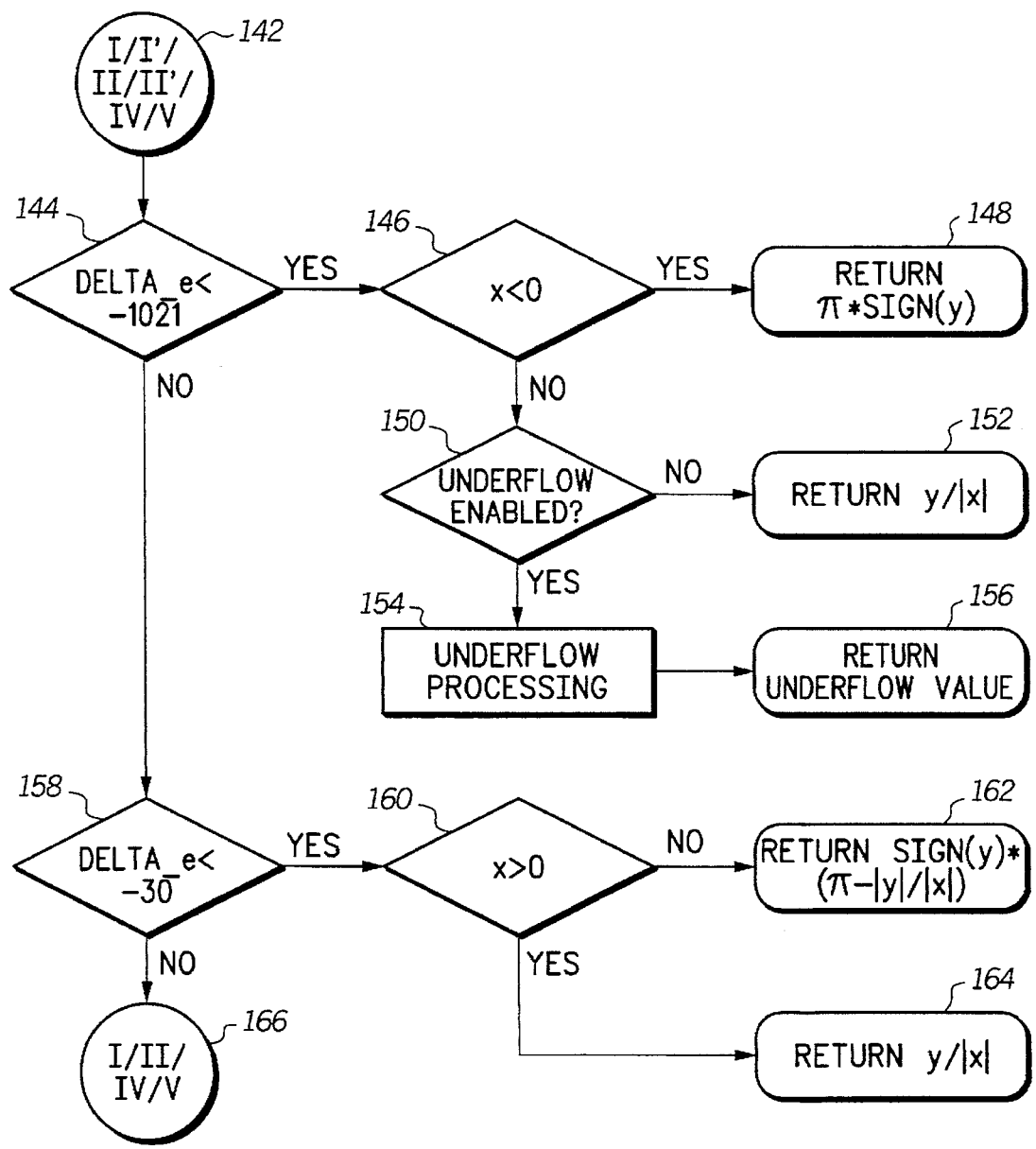
FIG.8-B

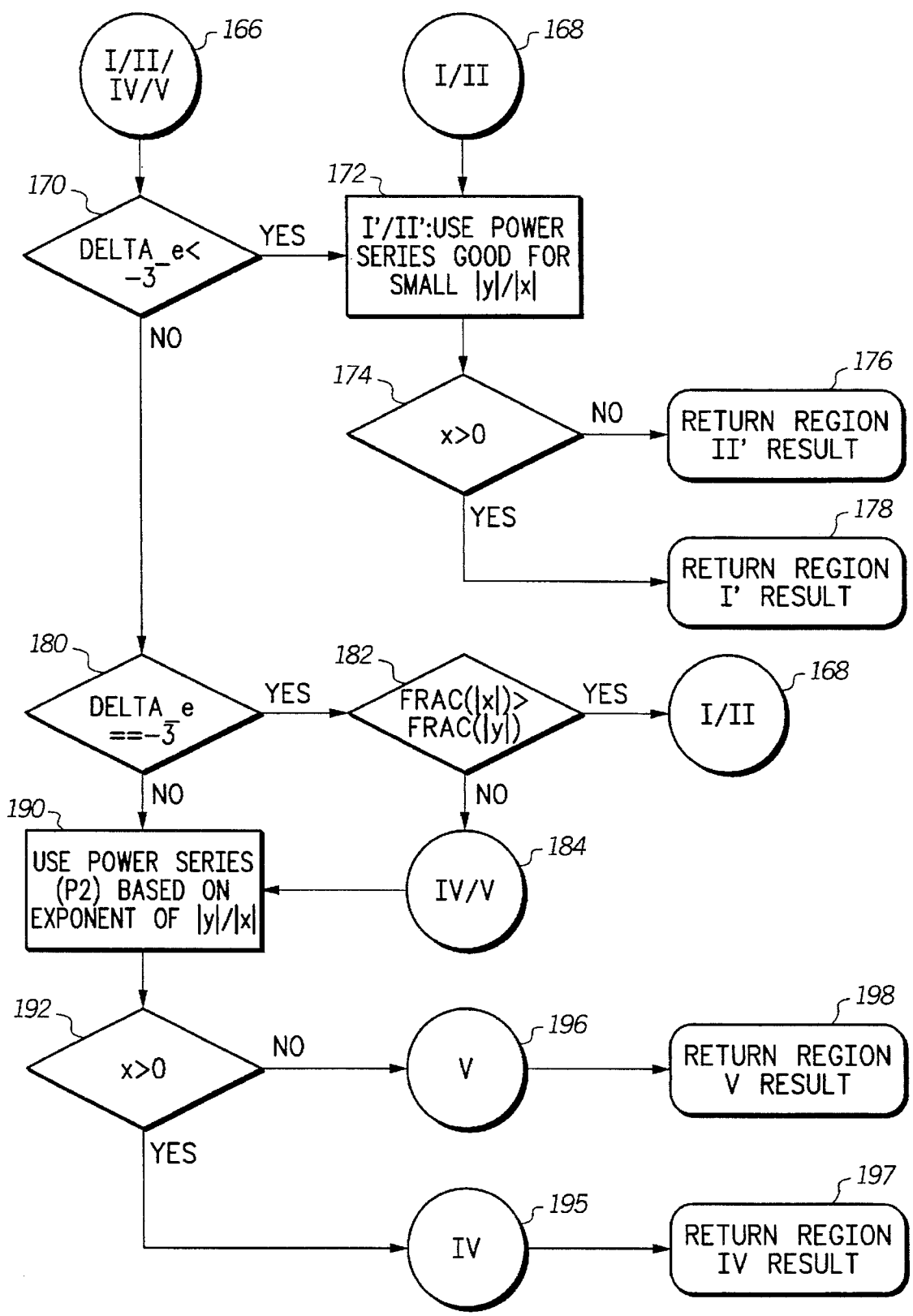
FIG.8-C

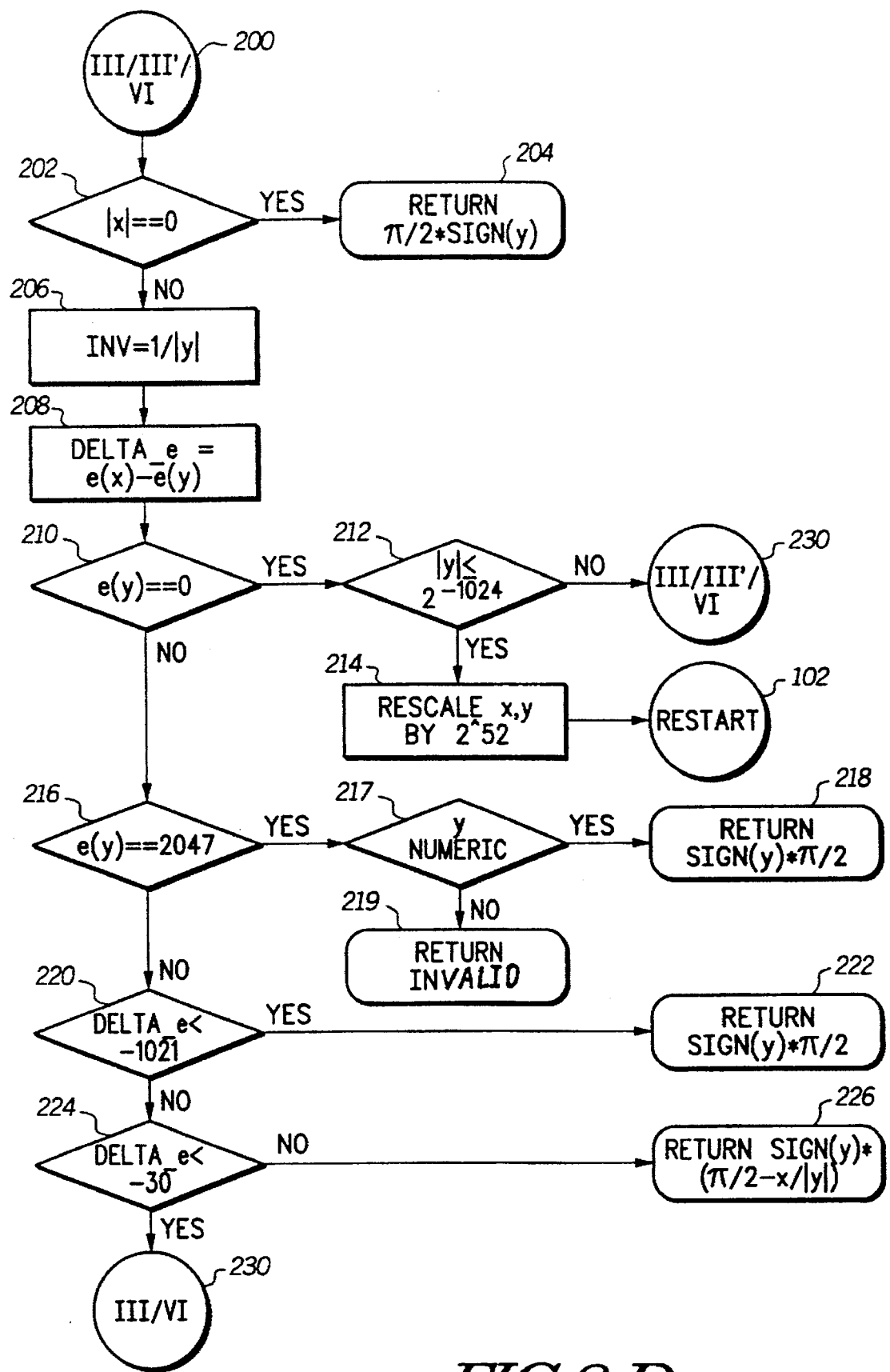
FIG.8-D

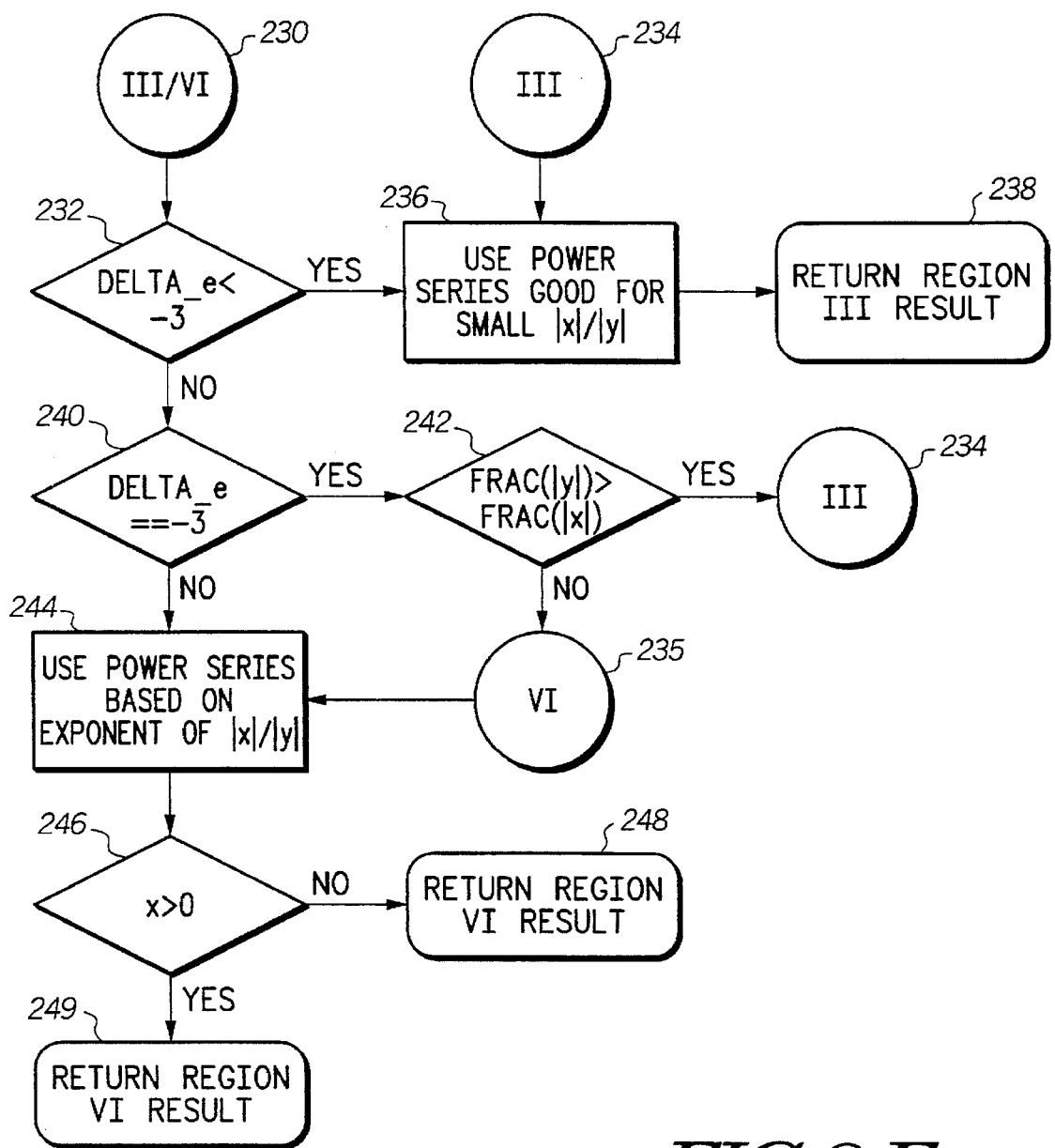
FIG.8-E

METHOD AND APPARATUS FOR FINDING ARCTANGENTS

CROSS REFERENCE TO RELATED APPLICATION

This application is related to my commonly assigned copending patent application entitled METHOD AND APPARATUS FOR REDUCING ROUNDING ERROR WHEN EVALUATING BINARY FLOATING POINT POLYNOMIALS, filed Apr. 18, 1995, and having U.S. patent application Ser. No. 08/424,032.

1. Field of the Invention

The present invention generally relates to data processing systems, and more specifically to efficiently finding arctangents.

2. Background of the Invention

A number s has an arctangent denoted by $\theta=\tan^{-1}(s)$ which is a real number in the interval $[-\pi/2,\pi/2]$ satisfying the equation $\tan(\theta)=s$. The value $\theta$ is the angle between the x-axis and a line with slope s. A pair of numbers (x,y) define a point in the x-y plane. Associated with the pair of numbers is an arctangent denoted by $\theta=\tan^{-1}(y,x)$ which is a real number in the interval $(-\pi,\pi]$ satisfying the equations $$\cos(\theta) = \frac{x}{\sqrt{x^2+y^2}} \text{ and } \sin(\theta) = \frac{y}{\sqrt{x^2+y^2}}$$

whenever x and y are not both 0. Although there are older and more inefficient methods for finding an arctangent $\theta=\tan^{-1}(s)$ or an arctangent $\theta=\tan^{-1}(y,x)$, the most recent and relevant prior art for finding the arctangent of a number comes from Shmuel Gal and Boris Bachelis, *An Accurate Elementary Mathematical Library for the IEEE Floating Point Standard*, ACM Transactions on Mathematical Software, 17, 1991, 26–45.

In order to understand the following methods and systems, a more detailed explanation of the prior art methods is needed. FIG. 1 (Prior Art) is a unit circle showing the different regions which are considered for numerical arguments in the teachings of Gal and Bachelis.

For calculating $\theta=\tan^{-1}(s)$, different cases are used depending on whether the argument s lies in the region a, b, c or d in FIG. 1. Region "a" includes only arguments s which satisfy $|s|<2^{-4}$. In this region, the arctangent is computed using a polynomial approximation:

$$\tan^{-1}(s) = s + c_3 \cdot s^3 + c_5 \cdot s^5 + \ldots + c_{13} \cdot s^{13} \quad (1)$$

The relative size of the remaining terms to the first term is less than $(2^{-4})^2$, which sets the scale for the maximum error in Units in the Last Place ("ulp") of about $2^{-8}$ ulp.

Region "b" includes arguments s which satisfy $2^{-4} \leq |s| \leq 1$. The argument s is used to compute an index $i = \lfloor 2^8 \cdot |s| \rfloor$, where the brackets indicate truncation to an integer. The index "i" is used to select a reference value $s_i$ and a set of polynomial coefficients $P_j{}^i$ and the arctangent is computed as:

$$\tan^{-1}(s) = \text{sign}(s)(P_0{}^i + P_1{}^i \cdot (|s|-s_i) + \ldots + P_5{}^i \cdot (|s|-s_i)^5). \quad (2)$$

The value $2^8$ is chosen so that the relative size of the remaining terms to the first term is about $2^{-8}$ setting the scale for the maximum error of about $2^{-8}$ ulp. The reference values $s_i$ are chosen so that the leading term $P_0{}^i$ is almost exactly the arctangent of $s_i$.

Region "c" includes arguments for which $1<|s|\leq 2^4$. In this region, a division is first used to compute $1/|s|$, which lies in the interval $[2^{-4},1)$ and the result is computed using the mathematical identity:

$$\tan^{-1}(s) = \text{sign}(s)\left(\frac{\pi}{2} - \tan^{-1}\left(\frac{1}{|s|}\right)\right). \quad (3)$$

The arctangent on the right-hand side of EQ. (3) is computed using the method appropriate for region b but for argument $1/|s|$ instead of s. Some extra care is needed to preserve precision in the division and subtraction operations.

Region "d" includes arguments for which $2^4<s$. In this region, a division is first used to compute $1/|s|$, which lies in the interval $[0,2^{-4})$ and the result is computed using the mathematical identity of EQ. (3). In this region, the arctangent on the right-hand side of EQ. (3) is computed using the method appropriate for region a with argument $1/|s|$ instead of s. Some extra care is needed to preserve precision in the division and subtraction operations.

There are disadvantages with Gal and Bachelis's method for computing the arctangent $\theta=\tan^{-1}(s)$:

First, a lot of polynomials are needed in region "b". The reason for this is that the number of polynomials must be about $2^8$ in order that the scale for the maximum error should be about $2^{-8}$ ulp. This uses up a large amount of memory for a complete set of tables. FIG. 2 (Prior Art) is a unit circle illustrating the density of polynomials needed for this method. For each line extending from the center to the edge of the unit circle there are actually three different sets of polynomial coefficients required. Using this many coefficients is likely to severely impact performance of any cached memory system from which these coefficients are obtained.

Second, a division operation is needed in region "c". This is very disadvantageous because for many floating-point processors division is very much slower than multiplication or addition and may also prevent execution of other floating-point operations until the division is completed. There are probably two reasons for using the division. First, the factor of $2^8$ to obtain an index would require a prohibitive number of polynomials to achieve the desired level of accuracy. Second, it is not apparent that a polynomial expansion in an argument larger than 1 can converge rapidly enough to be useful.

For calculating $\theta=\tan^{-1}(y,x)$, different cases are used depending on whether the argument s lies in the region a, a', b, b', c or d in FIG. 1.

In region "a", the computation is performed using the relationship:

$$\tan^{-1}(y,x) = \tan^{-1}(y/x) \quad (4)$$
$$= \tan^{-1}(s+\delta)$$

which requires a division. The value s on the right-hand side of EQ. (4) is the floating point value of y/x computed using by a division operation. In addition, an extra division operation is performed to compute a correction term $\delta$ which very nearly equals the difference between s and y/x. Without this correction term, the accuracy would be limited to about ½ ulp before rounding. The $\tan^{-1}(s+\delta)$ appearing on the right-hand side is computed using EQ. (1). Only the linear term in $\delta$ from EQ. (1) is needed, but it must be added at the right time to avoid loss of significance.

In region "b", the computation is performed using the relationship:

$$\tan^{-1}(y,x) = \text{sign}(y)\tan^{-1}(|y/x|) \quad (5)$$
$$= \text{sign}(y)\tan^{-1}(s+\delta)$$

which requires a division. The value s on the right-hand side of EQ. (5) is the floating point value of |y/x| computed using by a division operation. In addition, an extra division operation is performed to compute a correction term $\delta$ which very nearly equals the difference between s and |y/x|. Without this correction term, the accuracy would be limited to about ½ ulp before rounding. The $\tan^{-1}$ (s+$\delta$) appearing on the right-hand side is computed using EQ. (2). Only the linear term in $\delta$ from EQ. (2) is needed, but it must be added at the right time to avoid loss of significance.

In region "c", the computation is performed using the relationship:

$$\tan^{-1}(y,x) = \text{sign}(y)\left(\frac{\pi}{2} - \text{sign}(x)\tan^{-1}(|x/y|)\right) \quad (6)$$
$$= \text{sign}(y)\left(\frac{\pi}{2} - \text{sign}(x)\tan^{-1}(s+\delta)\right)$$

which requires a division. The value s on the right-hand side of EQ. (6) is the floating point value of |x/y| computed using by a division operation. In addition, an extra division operation is performed to compute a correction term $\delta$ which very nearly equals the difference between s and |x/y|. Without this correction term, the accuracy would be limited to about ½ ulp before rounding. The $\tan^{-1}$ (s+$\delta$) appearing on the right-hand side is computed using EQ. (2). Only the linear term in $\delta$ from EQ. (2) is needed, but it must be added at the right time to avoid loss of significance. In addition, since the exact value of $\pi/2$ is not exactly representable as a single floating point number, it is approximated as the sum of two floating point numbers. Care is taken so that the additions are done in an order which preserves the accuracy of the result to about $2^{-8}$ ulp before the final rounding.

In region "d", the computation is performed using the relationship of EQ. (6) which requires a division. The value s on the right-hand side of EQ. (6) is the floating point value of |x/y| computed using by a division operation. In addition, an extra division operation is performed to compute a correction term $\delta$ which very nearly equals the difference between s and |x/y|. Without this correction term, the accuracy would be limited to about ½ ulp before rounding. The $\tan^{-1}$ (s+$\delta$) appearing on the right-hand side is computed using EQ. (1). Only the linear term in $\delta$ from EQ. (1) is needed, but it must be added at the right time to avoid loss of significance. In addition, since the exact value of $\pi/2$ is not exactly representable as a single floating point number, it is approximated as the sum of two floating point numbers. Care is taken so that the additions are done in an order which preserves the accuracy of the result to about $2^{-8}$ ulp before the final rounding.

In region a', the computation is performed using the relationship:

$$\tan^{-1}(y,x) = \text{sign}(y)(\pi - \tan^{-1}(|y/x|)) \quad (7)$$
$$= \text{sign}(y)(\pi - \tan^{-1}(s+\delta))$$

which requires a division. The value s on the right-hand side of EQ. (7) is the floating point value of |y/x| computed using by a division operation. In addition, an extra division operation is performed to compute a correction term $\delta$ which very nearly equals the difference between s and |y/x|. Without this correction term, the accuracy would be limited to about ½ ulp before rounding. The $\tan^{-1}$ (s+$\delta$) appearing on the right-hand side is computed using EQ. (1). Only the linear term in $\delta$ from EQ. (1) is needed, but it must be added at the right time to avoid loss of significance. In addition, since the exact value of $\pi$ is not exactly representable as a single floating point number, it is approximated as the sum of two floating point numbers. Care is taken so that the additions are done in an order which preserves the accuracy of the result to about $2^{-8}$ ulp before the final rounding.

In region b', the computation is performed using the relationship of EQ. (7) which requires a division. The value s on the right-hand side of EQ. (7) is the floating point value of |x/y| computed using by a division operation. In addition, an extra division operation is performed to compute a correction term $\delta$ which very nearly equals the difference between s and |x/y|. Without this correction term, the accuracy would be limited to about ½ ulp before rounding. The $\tan^{-1}$ (s+$\delta$) appearing on the right-hand side is computed using EQ. (2). Only the linear term in $\delta$ from EQ. (2) is needed, but it must be added at the right time to avoid loss of significance. In addition, since the exact value of $\pi$ is not exactly representable as a single floating point number, it is approximated as the sum of two floating point numbers. Care is taken so that the additions are done in an order which preserves the accuracy of the result to about $2^{-8}$ ulp before the final rounding.

There are disadvantages with Gal and Bachelis's method for computing the arctangent $\theta = \tan^{-1}(y,x)$:

First, a lot of polynomials are needed in region "b". The reason for this is that the number of polynomials must be about $2^8$ in order that the scale for the maximum error should be about $2^{-8}$ ulp. This uses up a large amount of memory for a complete set of tables. FIG. 2 illustrates the density of polynomials needed for this method. For each line from the center to the edge of the unit circle there are approximately four different sets of polynomial coefficients which are needed. Using this many coefficients is likely to severely impact performance of a cached memory system from which these coefficients are obtained.

Second, two division operations are used in each case. The first division is used to compute an approximation to either x/y or y/x. The second is used in computing the correction $\delta$. This is disadvantageous because for many floating point processors division is very much slower than multiplication or addition and may also prevent execution of other floating point operations until the division is completed.

SUMMARY OF THE INVENTION

In accordance with the invention, Arctangents ($\tan^{-1}$) are calculated utilizing binary floating point numbers through much of the function's range by extracting into an Integer Register (54) as an index ("i") the exponent and a specified number of fraction bits from a Floating Point Register(s) (60). The index is utilized by an Integer Unit (52) to index into tables of polynomial coefficients and reference values. The floating point difference between the absolute value of the argument(s) and the reference value selected by the index is a polynomial linear term. The coefficients in the table entry selected by the index are multiplied in a Floating Point Unit (58) by integral powers of the linear term. The Floating Point Unit (58) then sums the high order polynomial terms. The zero$^{th}$ level term added to the product of the first level term multiplied by the linear term forms a "big" term. The rounding error resulting from the computation of the "Big" Term is calculated as a "Small" Term, which is added to the high order polynomial terms before the Big Term is added.

These and other features, and advantages, will be more clearly understood from the following detailed description taken in conjunction with the accompanying drawings. It is important to point out that there may be other embodiments of the present invention which are not specifically illustrated.

BRIEF DESCRIPTION OF THE DRAWINGS

FIGS. 8-A through 8-E are a flowchart showing the method utilized to compute $\tan^{-1}(y,x)$, in accordance with the present invention. The flowchart in FIG. 8 consists of 5 connected subfigures (FIG. 8-A through FIG. 8-E)

DETAILED DESCRIPTION OF A PREFERRED EMBODIMENT

Figure 3:
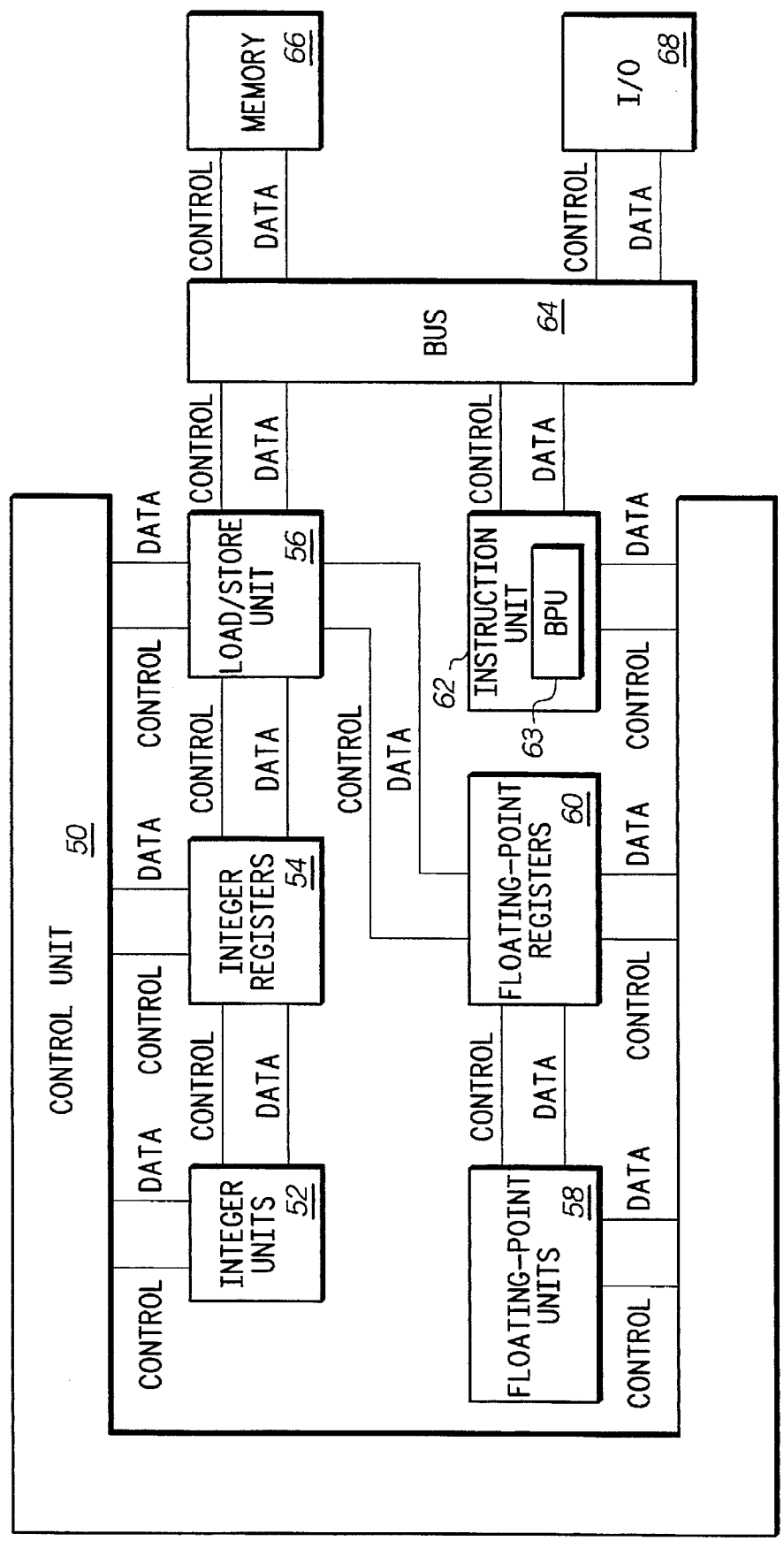
FIG. 3 is a block diagram showing high level components of a Data Processor, in accordance with the present invention.

FIG. 3 is a block diagram showing high level components of a Data Processor, in accordance with the current invention. FIG. 3 shows the structure of a Data Processor which can implement the method for computing an arctangent of a number $\theta=\tan^{-1}(s)$ or the arctangent of a pair of coordinates $\theta=\tan^{-1}(y,x)$.

A Control Unit 50 is coupled to one or more Integer arithmetic Units 52 which carry out arithmetic and logical operations on values stored in a set of Integer Registers 54, one or more Floating Point arithmetic Units 58 which carry out operations on values stored in Floating Point Registers 60, one or more Load/Store Units (not shown) which connect the Integer Registers 54 and Floating Point Registers 60 to external Memory 66 and input/output units 68 through a Bus interface 64, and an Instruction Unit 62 and Branch Processing Unit 63 which control the fetching, dispatching and completion of instructions. In some processors, some of these units may be combined or the functionality otherwise partitioned in some similar fashion. The computation of the arctangent ($\tan^{-1}$) is typically initiated when the argument value or pair of argument values are in Floating Point Registers 60 and a user instruction to the Branch Processing Unit 63 has caused a branch or subroutine call which causes the first instruction of the method to be fetched and dispatched by the Instruction Unit 62.

The Floating Point Unit 58 is assumed to comply with IEEE-754 standards for 32 and 64 bit floating point arithmetic. In particular, the IEEE-754 64-bit execution model implements binary floating point numbers with a one bit sign ("G"), an 11 bit exponent ("E"), and a 52 bit fraction ("F") part. The 11 bit exponent (E) is unsigned and biased by 1023, resulting in a range of $2^{-1022}$ to $2^{+1023}$. This invention can be utilized with other floating point representations, making the appropriate numerical changes.

Figure 4:
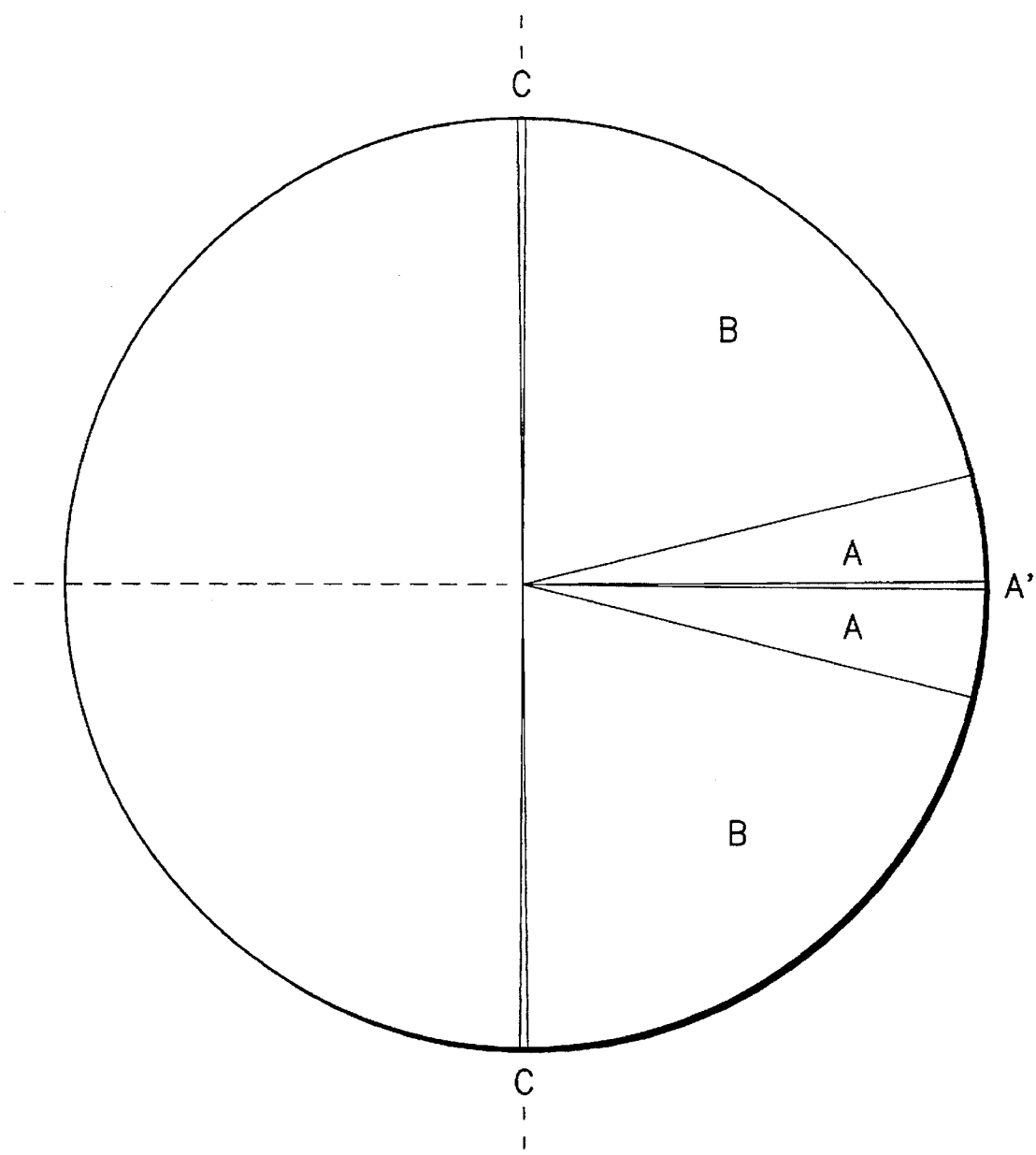
FIG. 4 is a graphical representation of a unit circle divided into regions to show the range of the different methods utilized to compute $\tan^{-1}(s)$, in accordance with the present invention.

FIG. 4 is a graphical representation of a unit circle divided into regions to show the range of the different methods utilized to compute $\tan^{-1}(s)$, in accordance with the current invention. For calculating $\theta=\tan^{-1}(s)$, different cases are used depending on whether the argument s lies in the region A, A', B or C in FIG. 4.

Region A' (Very Small Operands) includes only arguments s which satisfy $|s|<2^{-30}$. In this region, the arctangent is computed simply using:

$$\tan^{-1}(s)=s \qquad (8)$$

The relative error of omitting all other terms is less than $(2^{-30})^2$ (or $2^{-60}$), which sets the scale for the maximum error in units in the last place (ulp) of about $2^{-8}$ (i.e. $2^{-60}*2^{52}$) ulp.

Region A (Small Operands) includes arguments s which satisfy $2^{-30} \leq |s| < 2^{-M}$, where M can be chosen in the implementation to according to the maximum error which will be tolerated. In this region, the arctangent is computed using an odd polynomial with P coefficients:

$$\tan^{-1}(s)=s+d_3 \cdot s^3+\ldots+d_{2P-1}\cdot s^{2P-1} \qquad (9)$$

The number of coefficients and their values may be obtained by standard methods for computing minmax polynomials with a weighting function on an interval. For M=2, P=9, the relative size of the remaining terms to the first term is less than $(2^{-M})^2$, which sets the scale for the maximum error in units in the last place (ulp) of about $2^{-2M}$ ulp. For example, in one implementation the value M=2 was chosen.

Region B includes arguments s which satisfy $2^{-M} \leq |s| < 2^N$, where N is at the discretion of the implementer. In this region, a roughly logarithmic index is computed by extracting the exponent bits and a number F of fraction bits from the floating point representation of the argument s. Interpreting this sequence of bits as a binary integer and subtracting from this binary integer the result of shifting left F bits the exponent bits of $2^{-M}$ gives an integer index ("i") which is used to look up a reference variable $s_i$ and a set of polynomial coefficients for computing the arctangent:

$$\tan^{-1}(s)=\text{sign}(s)(Q_0^i+Q_1^i\cdot(|s|-s_i)+\ldots+Q_L^i\cdot(|s|-s_i)^L) \qquad (10)$$

There are a number of important features of this expression. First, use of this index value ("i") enables a polynomial approximation to be used over an extremely large range of values. In the present embodiment, N was chosen to be 20 to ease computation in region C. This enables computations to be performed over a very wide range of slopes without the use of any divisions. Second, the $s_i$ value can always be chosen so that $|s|-s_i$ is exactly representable. This is done by selecting $s_i$ values that have the same exponent (E) as s. When both values have the same exponent (E), the arithmetic is exact, and there is no rounding.

Another important innovation lies in the way in which EQ. (10) is evaluated to minimize rounding error. With normal methods, the contribution to the final relative error from just rounding this term would be of the order of the maximum value of $$\frac{(|s| - s_i)}{s_i}$$

which is about $2^{-(F+1)}$. The new approach is to rearrange the computation of EQ. (10) as:

$$\tan^{-1}(s) = \text{sign}(s)(\text{big}+\text{small}+Q_2^i \cdot (|s|-s_i)^2 + \ldots + Q_L^i \cdot (|s|-s_i)^L) \quad (11)$$

where the new terms big and small are obtained by the sequence of operations $$t_1 = \langle Q_1^i \cdot (|s|-s_i) \rangle$$

$$t_2 = \langle Q_1^i \cdot (|s|-s_i) - t_1 \rangle$$

$$\text{big} = \langle Q_0^i + t_1 \rangle$$

$$t_3 = \langle \text{big} - Q_0^i \rangle$$

$$t_4 = \langle t_3 - t_1 \rangle$$

$$\text{small} = \langle t_2 - t_4 \rangle \quad (12)$$

In the right-hand sides of EQ. (12), the angle brackets denote the result of carrying out the given floating point as an atomic operation and then rounding. In some microprocessors, the computation of the term $t_2$ can be carried out as a single operation, while on others the computation may require using single precision arithmetic to obtain an approximation to $t_2$. The contribution to the relative error from just rounding the next term in EQ. (11) then becomes about $2^{-2(F+1)}$. The effect of this is that by doing the particular sequence of computations described in EQ. (12), the density of polynomial tables which is needed to achieve a given error before the operation which does the final rounding is reduced by a factor of about $2^{-(F+1)}$. In one embodiment, the actual value chosen was F=2.

Note that this method of utilizing big and small is equally useful in maintaining accuracy when evaluating other polynomials. For example, this method can be used to improve the accuracy of computating arcsin ($\sin^{-1}$), arccosin ($\cos^{-1}$), gamma, and error functions.

Region C includes numeric arguments s which satisfy $2^N \leq |s|$. For arguments chosen uniformly around the unit circle, the probability of finding an argument in this region is about $2^{-N}$. By choosing N=20, an adequate approximation is:

$$\tan^{-1}(s) = \text{sign}(s) \left( \frac{\pi}{2} - \frac{1}{|s|} \right). \quad (13)$$

This approximation has a maximum relative error of about $2^{-9}$ ulp before the final rounding. It is unimportant to compute a correction to the reciprocal. For arguments greater than or equal to $2^{53}$ the reciprocal may be neglected.

For non-numeric arguments, a system-dependent exception condition or a default result should be returned.

Figure 5:
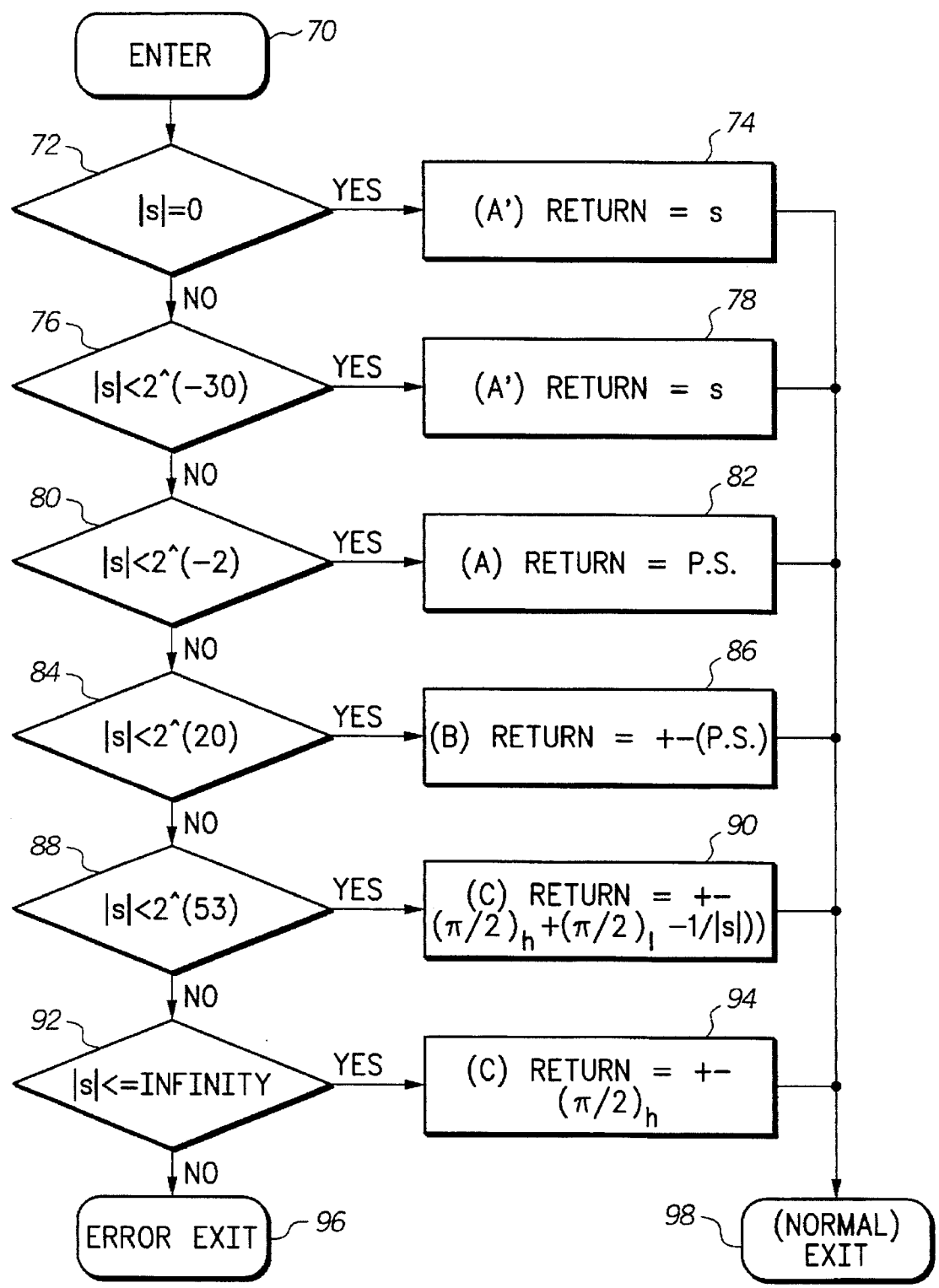
FIG. 5 is a flowchart showing the method utilized to compute $\tan^{-1}(s)$, in accordance with the present invention.

FIG. 5 is a flowchart showing the method utilized to compute $\tan^{-1}(s)$, in accordance with the current invention. The flow chart shows the logical sequence of operations used in computing $\tan^{-1}(s)$. The consideration of cases is presented in this figure sequentially, although in specific implementations it is likely that rearrangement of the logical structure to take advantage of processor structure will result in improved performance.

The process is entered at a step 70. In step 72, it is determined whether the argument s is a signed zero. If it is, the argument is in region A' and the result returned in step 74 is the argument s according to EQ. (8). Otherwise, the argument is compared to $2^{-30}$ in a step 76. If it is smaller, the argument is in region A' and the result returned in step 78 is the argument s according to EQ. (8). Otherwise, the argument is compared to $2^{-M}$ in step 80, where in a particular implementation M was chosen to be 2. If it is smaller, the argument is in region A and the result returned in step 82 is given by EQ. (9) where the polynomial coefficients were chosen to minimize the maximum relative error. Otherwise, the argument is compared to $2^N$ in step 84. If it is smaller, the argument is in region B, an index i, a reference value $s_i$, and a set of polynomial coefficients $Q_j^i$ are looked up and the result returned in step 86 is obtained following EQ. (12). Otherwise, the argument is compared with $2^{53}$ in step 88. If it is smaller, the result returned in step 90 is given by EQ. (13). This is the only circumstance in this method for which a division is needed to compute $\tan^{-1}(s)$.

Otherwise, step 92 checks to see if the argument is numeric. If it is, the result returned in step 94 is given by EQ. (13) but with the term with the division omitted. All of the return results in steps 74, 78, 82, 86, 90 and 94 are normal exits in step 98 unless inexact exceptions are to be allowed. If inexact exceptions are allowed, then only step 74 is a normal exit and steps 78, 82, 86, 90 and 94 are inexact exceptions and step 98 should cause inexact exception processing to be performed in a system-dependent manner. Finally, if step 92 determines that the argument is not numeric, an exception condition is signaled in step 96.

Figure 1:
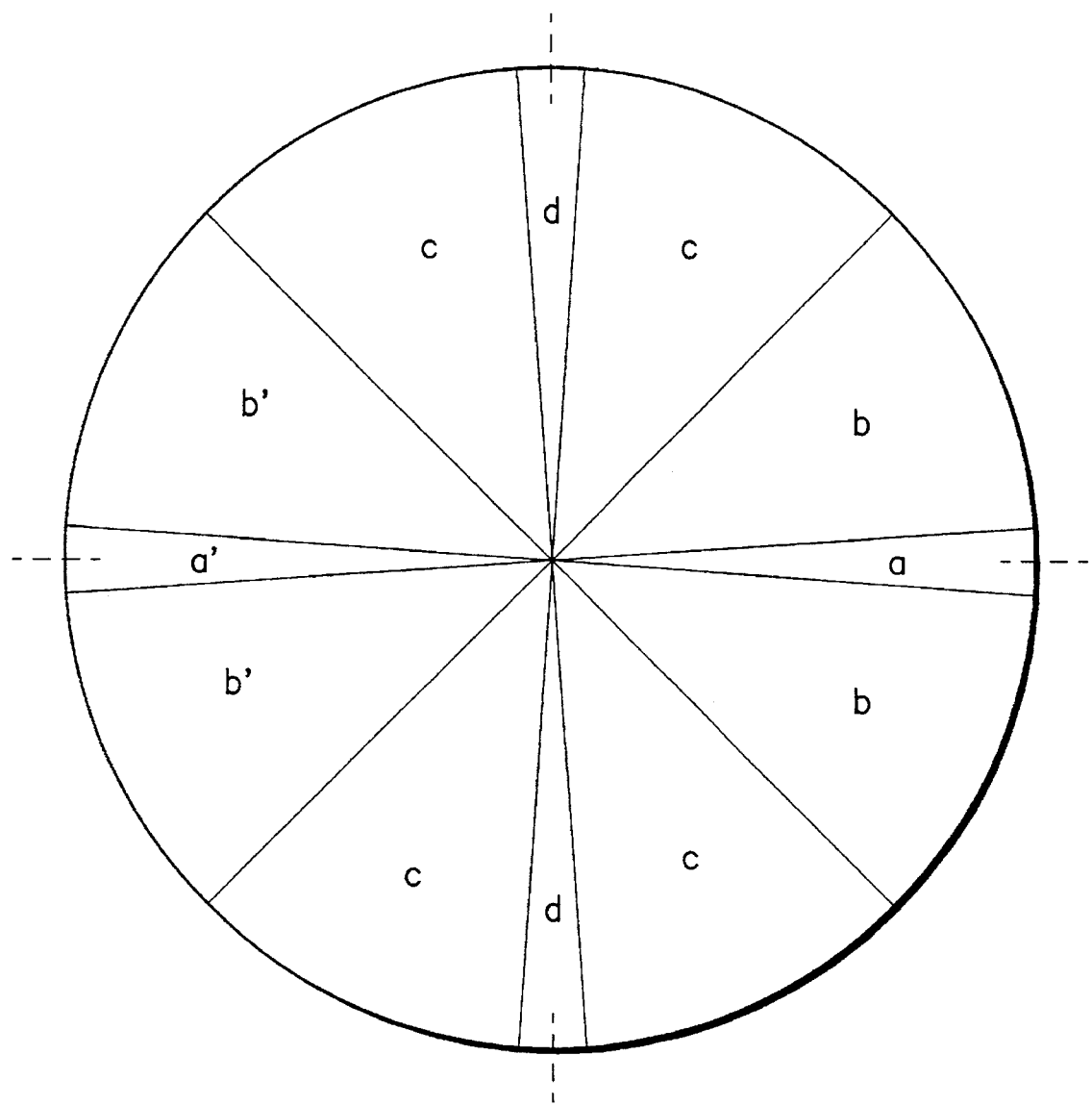
FIG. 1 (Prior Art) is a graphical representation of a unit circle divided into regions to show the range of the different methods utilized in the Prior Art.
Figure 2:
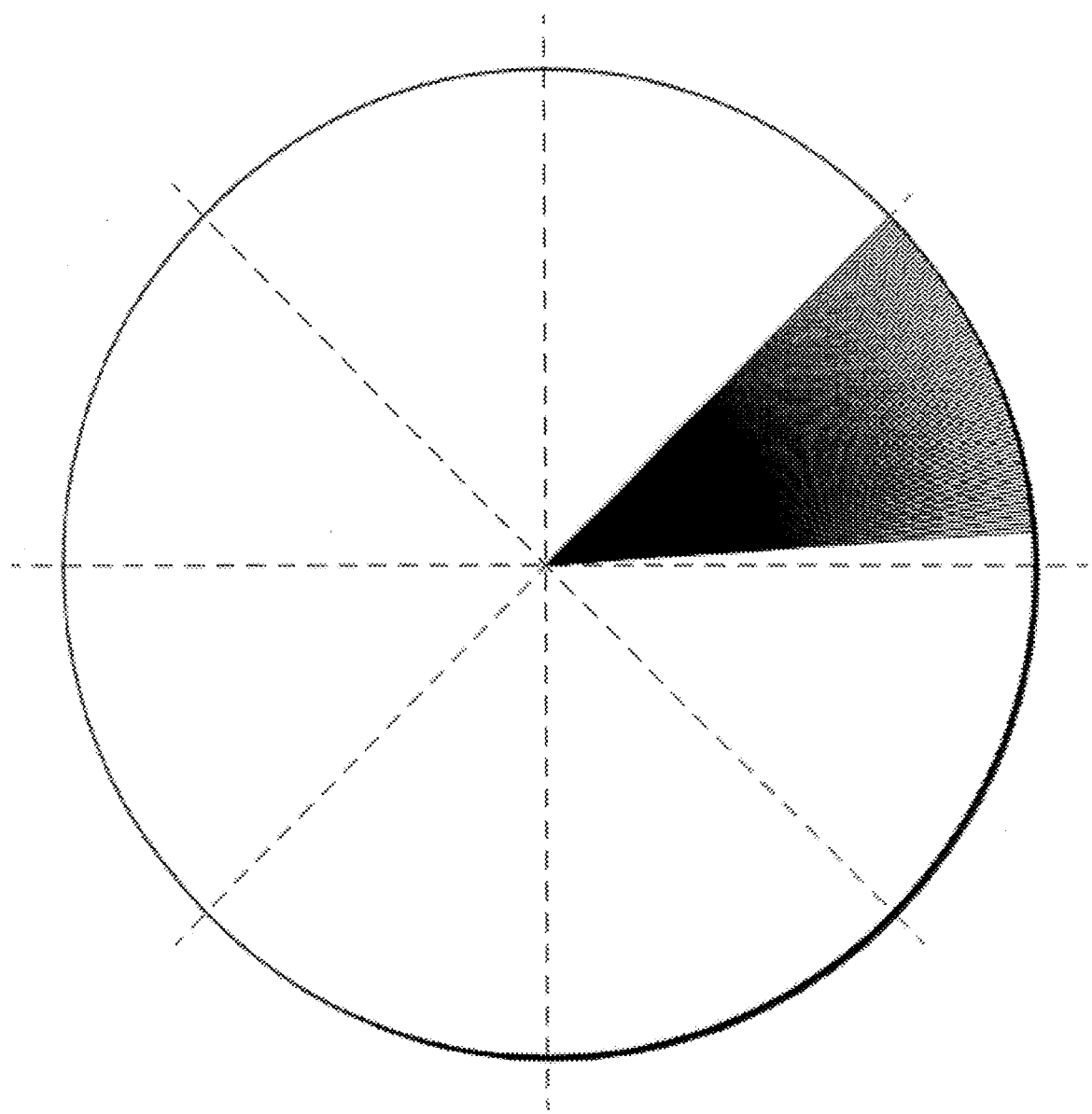
FIG. 2 (Prior Art) is a graphical representation of a unit circle divided into eighths showing the density of the polynomials utilized in the Prior Art to compute $\tan^{-1}$, with each line representing three such polynomials.
Figure 6:
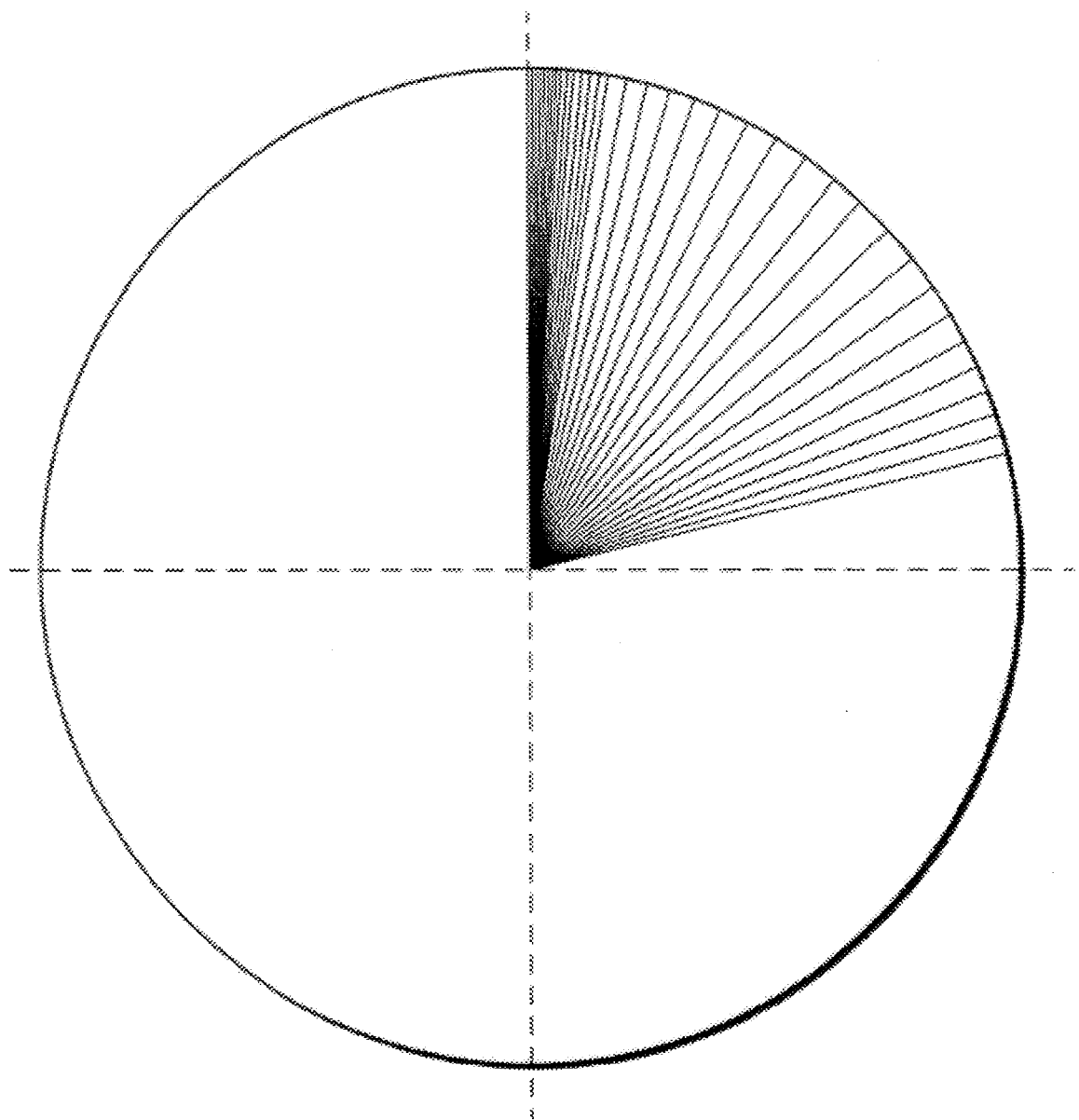
FIG. 6 is a graphical representation of a unit circle divided into quarters showing the density of the polynomials utilized to compute $\tan^{-1}(s)$, in accordance with the present invention.

FIG. 6 is a graphical representation of a unit circle divided into quarters showing the approximate density of the polynomials utilized to compute $\tan^{-1}(s)$, in accordance with the current invention. Except near the vertical limit, each line corresponds to a single polynomial rather than the approximately four polynomials shown for the prior art in FIG. 2. The significant decrease in the density, total number of polynomials, and total number of coefficients is a big improvement over the prior art.

Figure 7:
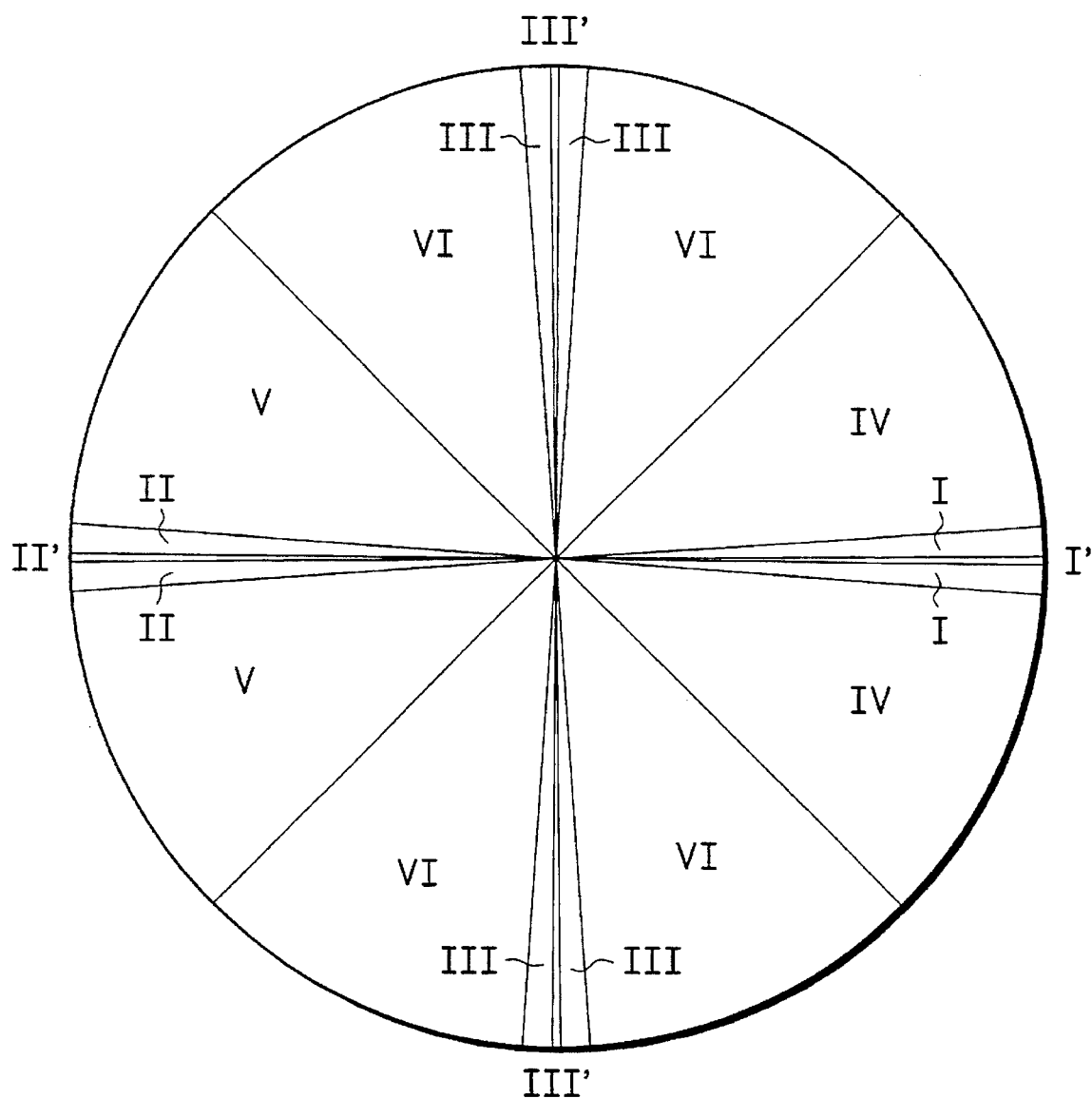
FIG. 7 is a graphical representation of a unit circle divided into regions to show the range of the different methods utilized to compute $\tan^{-1}(y,x)$, in accordance with the present invention.

FIG. 7 is a graphical representation of a unit circle divided into regions to show the range of the different methods utilized to compute $\tan^{-1}(y,x)$, in accordance with the current invention. For calculating $\theta = \tan^{-1}(y,x)$, different cases are used depending on the values of the arguments y and x. In addition, there are a few singular sets of arguments which need to be considered separately. The main regions to be considered are the regions I, I', II, II', III, III', IV, V and VI shown in FIG. 7.

In all except a few cases, it is necessary to use a division to compute a ratio of the two arguments using arithmetic or absolute values. For many computer processors, this operation may tie up the floating point arithmetic unit, so it is often desirable to do as much of the decision-making logic using only fixed point methods. In addition, additional operations are needed to compute a correction to the result of the division in order that the rounding error in the result not be dominated by the error in the division operation.

In the prior art, two division operations were used which tied up the floating point unit for a long time. In the present embodiment, instead of dividing the larger argument into the smaller one, the reciprocal of the larger argument is taken. This enables an approximate reciprocal to be computed with just one additional multiplication and the correction to be computed with a few extra instructions. A sequence of operations which will take two numbers a and b and generate an approximate ratio expressed as a sum:

$$a/b = r + \epsilon \qquad (14)$$

is:

$$t_5 = (1/b)$$
$$r = (a \cdot t_5)$$
$$t_6 = (1 - b \cdot t_5)$$
$$t_7 = (a \cdot t_5 - r)$$
$$\epsilon = (r \cdot t_6 + t_7) \qquad (15)$$

The general process used is to take the reciprocal of the absolute value of the larger of the two arguments. While that division is taking place, it is possible to determine an acceptable region for the arguments. The use of slightly overlapping regions makes it possible to choose a region without having to do high-precision floating point comparisons. One method uses the Integer Unit 52 to compare exponents (E) extracted from each argument.

Regions I' and II' include arguments for which $|x|>|y|$ and the exponent of x is at least 31 more than the exponent of x, which insures that $|y|/|x|<2^{-30}$. In region I', where $x>0$, the arctangent is:

$$\tan^{-1}(y,x) = r + \epsilon \qquad (16)$$

where r and $\epsilon$ are computed using EQ. (15) with $a=y$ and $b=|x|$. In region II', where $x<0$, the arctangent is:

$$\tan^{-1}(y,x) = \text{sign}(y)(\pi\_\text{high} - (r - \pi\_\text{low})) \qquad (17)$$

where r is computed using EQ. (15) with $a=|y|$ and $b=|x|$ and $\epsilon$ is not needed.

Region III' include arguments for which $|y|>|x|$ and the exponent of y is at least 31 more than the exponent of x. In region III', the arctangent is $$\tan^{-1}(y,x) = \text{sign}(y)\left(\frac{\pi\_\text{high}}{2} - \left(r - \frac{\pi\_\text{low}}{2}\right)\right) \qquad (18)$$

where r is computed using EQ. (15) with $a=x$ and $b=|y|$ and $\epsilon$ is not needed.

Region I includes arguments for which $x>|y|$ and either the exponent of x minus the exponent of y is less than 31 and greater than M or the exponent of x minus the exponent of y is equal to M and the first 20 fraction bits of y are less than or equal to the first 20 fraction bits of x. This insures, at cheap cost, that the ratio $|y|/x$ is not very much larger than $2^{-M}$. In a particular implementation, M was taken to be 3. The values r and $\epsilon$ are computed using EQ. (15) with $a=y$ and $b=x$. The arctangent is computed as $$\tan^{-1}(y,x) = r + (e_3 \cdot r^3 + \ldots + e_{2P-1} \cdot r^{2P-1} + \epsilon(1 - r^2)) \qquad (19)$$

Region II includes arguments for which $-x>|y|$ and either the exponent of x minus the exponent of y is less than 31 and greater than M or the exponent of x minus the exponent of y is equal to M and the first 20 fraction bits of y are less than or equal to the first 20 fraction bits of x. This insures, at cheap cost, that the ratio $|y|/|x|$ is not very much larger than $2^{-M}$. The values r and $\epsilon$ are computed using EQ. (15) with $a=|y|$ and $b=|x|$. The arctangent is computed as:

$$\tan^{-1}(y,x) = \text{sign}(y)(\text{high} + (\text{low} - (e_3 \cdot r^3 + \ldots + e_{2P-1} \cdot r^{2P-1} - \pi\_\text{low} - \epsilon(1 - r^2)))) \qquad (20)$$

To ensure small rounding error, the combination $\pi_h - r$ is computed as:

$$\text{high} = (\pi\_\text{high} - r)$$
$$\text{low} = -((\text{high} - \pi\_\text{high}) + r) \qquad (21)$$

Region III includes arguments for which $|y|>|x|$ and either the exponent of y minus the exponent of x is less than 31 and greater than M or the exponent of y minus the exponent of x is equal to M and the first 20 fraction bits of x are less than or equal to the first 20 fraction bits of y. This insures, at cheap cost, that the ratio $|x|/|y|$ is not very much larger than $2^{-M}$. The values r and $\epsilon$ are computed using EQ. (15) with $a=x$ and $b=|y|$. The arctangent is computed as:

$$\tan^{-1}(y,x) = \text{sign}(y)\left(\text{high} + \left(\text{low} - \left(e_3 \cdot r^3 + \ldots + e_{2P-1} \cdot r^{2P-1} - \frac{\pi\_\text{low}}{2} - \epsilon(1 - r^2)\right)\right)\right) \qquad (22)$$

To ensure small rounding error, the combination $$\frac{\pi\_\text{high}}{2} - r$$

is computed as:

$$\text{high} = \left(\frac{\pi\_\text{high}}{2} - r\right) \qquad (23)$$
$$\text{low} = -\left(\left(\text{high} - \frac{\pi\_\text{high}}{2}\right) + r\right)$$

Region IV includes arguments for which $x \geq |y|$ and either the exponent of x minus the exponent of y is less than M or the exponent of x minus the exponent of y is equal to M and the first 20 fraction bits of x are greater than the first 20 fraction bits of y. This insures, at cheap cost, that the ratio $|y|/x$ is not very much less than $2^{-M}$ and is less than or equal to 1. The values r and $\epsilon$ are computed using EQ. (15) with $a=|y|$ and $b=x$. A roughly logarithmic index "i" is obtained by extracting the exponent and first F fraction bits of r. This is used to look up a set of polynomial coefficients and a reference value $r_i$. The arctangent is computed as:

$$\tan^{-1}(y,x) = \text{sign}(y)(\text{big} + (\text{little} + R_1^i \cdot \epsilon + 2R_2^i \cdot \chi \cdot \epsilon + R_2^i \cdot \chi^2 + R_L^i \cdot \chi^L)) \qquad (24)$$

where $\chi = r - r_i$. An important feature of this computation is that the subtraction which computes $\chi$ is carried out without rounding error. To ensure good accuracy before the rounding of the final operation, the values big and little are obtained by the sequence of operations:

$$t_8 = (R_1^i \cdot \chi)$$
$$t_9 = (R_1^i \cdot \chi - t_8)$$

big=$(R_0{}^i+t_8)$ $t_{10}=(big-R_0{}^i)$ little=$t_9-(t_{10}-t_8)$ (25)

This sequence of operations is important because it makes the critical rounding proportional to $2^{-2M}$ ulp rather than $2^{-M}$ ulp as in the prior art. This allows many fewer polynomials to be used, although more coefficients are needed in each one. On balance, there is a substantial savings in the number of coefficients which are needed and the present embodiment will not degrade cache memory performance nearly as much as the prior art.

Region V includes arguments for which $-x \geq |y|$ and either the exponent of x minus the exponent of y is less than M or the exponent of x minus the exponent of y is equal to M and the first 20 fraction bits of x are greater than the first 20 fraction bits of y. This insures, at cheap cost, that the ratio $|y|/|x|$ is not very much less than $2^{-M}$ and is less than or equal to 1. The values r and $\epsilon$ are computed using EQ. (15) with a=|y| and b=|x|. A roughly logarithmic index "i" is obtained by extracting the exponent and first F fraction bits of r. This is used to look up a set of polynomial coefficients and a reference value $r_i$. The arctangent is computed as:

$$\tan^{-1}(y,x) = \text{sign}(y) \text{great} + (\text{tiny} - R_1{}^i \cdot \epsilon - 2R_2{}^i \cdot \chi \cdot \epsilon - R_2{}^i \chi^2 - \ldots - R_L{}^i \chi^L)) \quad (26)$$

where $\chi = r - r_i$. To ensure small rounding error, the values great and tiny are obtained by the sequence of operations:

$t_{11}=(R_1{}^i \chi)$ $t_{12}=(R_1{}^i \chi - t_{11})$ great=$(\pi\_high - R_0{}^i - t_{11})$ $t_{13}=(\text{great} - \pi\_high)$ $t_{14}=(t_{13}+R_0{}^i)$ tiny=$\pi\_low - t_{12} - (t_{14}+t_{11})$ (27)

This sequence of operations is important because it makes the critical rounding proportional to $2^{-2M}$ ulp rather than $2^{-M}$ ulp as in the prior art. This allows many fewer polynomials to be used, although more coefficients are needed in each one. On balance, there is a substantial savings in the number of coefficients which are needed and the present embodiment will not degrade cache memory performance nearly as much as the prior art.

Region VI includes arguments for which $|y|>|x|$ and either the exponent of y minus the exponent of x is less than M or the exponent of y minus the exponent of x is equal to M and the first 20 fraction bits of y are greater than the first 20 fraction bits of x. This insures, at cheap cost, that the ratio $|x|/|y|$ is not very much less than $2^{-M}$ and is less than 1. The values r and $\epsilon$ are computed using EQ. (15) with a=|x| and b=|y|. A roughly logarithmic index "i" is obtained by extracting the exponent (E) and first "f" fraction bits (F) of r. This is used to look up a set of polynomial coefficients and a reference value $r_i$. The arctangent is computed as:

$$\tan^{-1}(y,x) = \text{sign}(y)(\text{major} + (\text{minor} - \text{sign}(x)(R_1{}^i \cdot \epsilon + 2R_2{}^i \cdot \chi \cdot \epsilon + R_2{}^i \chi^2 + \ldots + R_L{}^i \chi^L))) \quad (28)$$

where $\chi = r - r_i$. To ensure good rounding error, the values major and minor are obtained by the sequence of operations:

$t_{15} = (R_1{}^i \cdot \chi)$
$t_{16} = (R_1{}^i \cdot \chi - t_{15})$ (29)

$\text{major} = \left( \dfrac{\pi\_high}{2} - \text{sign}(x) \cdot (R_0{}^i - t_{15}) \right)$ $t_{17} = \left( \text{major} - \dfrac{\pi\_high}{2} \right)$ $t_{18} = (t_{17} + \text{sign}(x) \cdot R_0{}^i)$ $\text{minor} = \dfrac{\pi\_low}{2} - t_6 - (t_{18} + t_{12})$ This sequence of operations is important because it makes the critical rounding proportional to $2^{-2M}$ ulp rather than $2^{-M}$ ulp as in the prior art. This allows many fewer polynomials to be used, although more coefficients are needed in each one. On balance, there is a substantial savings in the number of coefficients which are needed and the present embodiment will not degrade cache memory performance nearly as much as the prior art.

FIG. 8 is a flowchart showing a practical implementation of the computation of $\tan^{-1}(y,x)$ for the choices M=3 and F=3. The flowchart consists of five connected subfigures (FIG. 8-A through FIG. 8-E).

The computation is entered in a step 100. The absolute values of x and y are compared in a step 104. The purpose is to determine which quadrant the argument lies in. In a specific implementation, the comparisons of x and y with 0 were performed at the same time to allow the result of the comparison of absolute values to be more likely to be completed before branching based on the result. In step 104, if the magnitude of x is less than the magnitude of y, the next step taken is step 200. Otherwise, the comparison of y with 0 is used in step 106 to determine whether a quick result can be determined. If y is 0, then step 108 determines whether the sign of x is positive or negative (a negative 0 should still be considered negative). If the sign of x is positive, the result returned is y (exact) in step 110.

If the sign of x is negative, the result returned is sign(y)·$\pi$ in step 116. If y is not 0, then in step 118 the inverse of |x| is computed. In the particular implementation, this division takes many processor cycles, tying up the Floating Point Unit 58, and preventing further floating point instructions from being initiated. For that reason, the subsequent steps can be carried out using instructions available from the Integer Unit 52. In step 120, the difference $\Delta e$ between the exponents (E) of y and x is computed and used in subsequent steps as the basis for making decisions.

In step 122, the check is made to see if the biased exponent of x is zero. The argument x cannot be zero because it is at least as big in magnitude as y which is not zero. However, the exponent can be zero if x is a denormalized number. In this case, the reciprocal initiated in step 118 is likely to overflow. In step 124, a check is made to see if that is indeed likely by looking at the fraction bits to see if $|x| \leq 2^{-1024}$. If it is, statistically an unlikely case, the result of the divide will overflow. In this case, step 126 scales both arguments by a factor of $2^{52}$ and the process is restarted at step 102, which simply repeats the steps starting at step 100. If the check in step 124 guarantees no overflow in the reciprocal operation, then control proceeds via step 142, where the actual case will be selected from the possible cases I, I', I, II', IV and V.

If step 122 found the biased exponent field to be non-zero, step 130 checks to see if the biased exponent of x is 2047, which signifies either an infinity or a non-numeric quantity (NaN="Not a Number"). If it is not 2047, then the next step taken is step 142. If it is 2047, then step 131 determines whether the argument x is infinity or not numeric. If it is not numeric, then the appropriate indication of an invalid argument is returned in step 134. This might be a default value or cause an exception to be raised in a system-dependent manner.

If the argument x is numeric, step 132 checks to see if the biased exponent of y is 2047. If it is, then y is either numeric or infinity. Step 133 determines which of these two cases prevails. If y is not numeric, then step 134 returns the appropriate indication of an invalid argument. If y is numeric, then step 137 determines whether the argument x is positive. If it is, then step 138 returns sign(y)·π/4. This result is inexact, since the exact result cannot be represented exactly by a floating point number. If the argument x is negative, then step 139 returns sign(y)·3π/4. If step 132 determined that y does not have a biased exponent of 2047, then step 134 check the sign of the argument x. If it is positive, then step 135 returns an exact 0 with the sign of y. Otherwise step 136 returns an inexact π with the sign of y.

Step 142 is reached by the above logic if x is larger in magnitude than y and not infinite. It leads to step 144, which compares the difference in exponents Δe with −1021. If it is greater than or equal, then in step 158, the difference in exponents Δe is compared with −30. If it is greater than or equal to −30, then step 166 is taken to determine whether the region is I, II, IV or V. If it is less than −30, then step 160 uses the sign of x to determine whether to return the result of EQ. (16) in step 164 for positive x or the result of EQ. (17) in step 162 for negative x. If the comparison in step 144 found the difference in exponents to be less than −1021, step 146 examines the sign of x. If it is negative, then step 148 returns sign(y)·π. Otherwise if step 150 determines that under flow exceptions are disabled, step 152 returns the result of EQ. (16). Otherwise, it is likely that the result will underflow and step 154 performs underflow processing and step 156 returns an adjusted under flow value.

Step 166 is reached when it is necessary to determine which of the cases I, II, IV or V is present. Step 170 determines whether Δe is less than −M which in this implementation is −3. If it is, then step 172 determines whether to use EQ. (19) in step 178 to return the region I result or EQ. (22) in step 176 to return the region II result. Either result is inexact. Otherwise, step 180 determines whether Δe is larger than −M. If not, then a comparison of the leading fraction bits of the two arguments is performed in step 182. If the x fraction bits are not larger than the y fraction bits, then the region is either I or II and control proceeds through step 168 to step 172. If step 180 determines that Δe is larger than −M or step 182 determines that the x fraction bits are at least as large as the y fraction bits and proceeds through step 184, step 190 selects the reference value and polynomial coefficients to be evaluated through an index value computed by extracting the exponent and leading fraction bits of |y|/|x|. Step 192 uses the sign of x to determine whether to evaluate and return the region IV result of EQ. (24) in steps 195 and 197 (inexact) or the region V result of EQ. (27) in steps 196 and 198.

Step 200 is initiated if the arguments lie in region III, III' or VI or are invalid. Step 202 determines if x is zero. If it is zero, step 204 returns sign(y)·π/2. Otherwise, the computation of the reciprocal of |y| is initiated in step 206. The difference of exponents Δe (in this case the exponent of x minus the exponent of y) is computed in step 208. Again, this value will be used in making decisions while the floating point division is executing.

In step 210, the biased exponent of y is compared with zero. If it is zero, step 212 checks to see if |y|≦−1024. If it is not, then the region is III, III' or VI and is to be determined beginning in step 230. If it is, then it is necessary to rescale both arguments and restart in step 102. If the biased exponent was not found to be 0 in step 210, step 216 checks to see if y is infinite or non-numeric. If so, step 217 checks to see whether it is infinite or non-numeric. If it is non-numeric, step 219 provides the system-dependent response appropriate for an invalid argument. If it is infinite, step 218 returns the inexact result sign(y)·90/2. If y is finite and numeric, step 220 checks to see whether Δe is smaller than −1021. If it is, then step 222 returns the inexact result of sign(y)·π/2. Otherwise, step 224 checks to see if Δe is less than −30. If it is, step 226 returns the inexact region III' result of EQ. (18). Otherwise, step 230 starts the selection of region III or VI.

In step 232, Δe is compared with −3. If it is smaller, then it is in region III and the polynomial coefficients are obtained in step 236 and the inexact result given by EQ. (23) is returned in step 238. If Δe is found to be −3 in step 240, step 242 compares the high-order fraction bits of the arguments. If the fraction bits (F) of y are larger, then the arguments are in region III and step 234 leads to the region III processing starting with step 236. If the fraction bits are smaller or Δe is not −3, then step 244 constructs an index ("i") by extracting the exponent and fraction bits of |y|/|x| and uses the index ("i") to look up polynomial coefficients ($C^j_i$) and a reference value ($r_i$). Step 246 then returns the region VI result given by EQ. (28).

Figure 9:
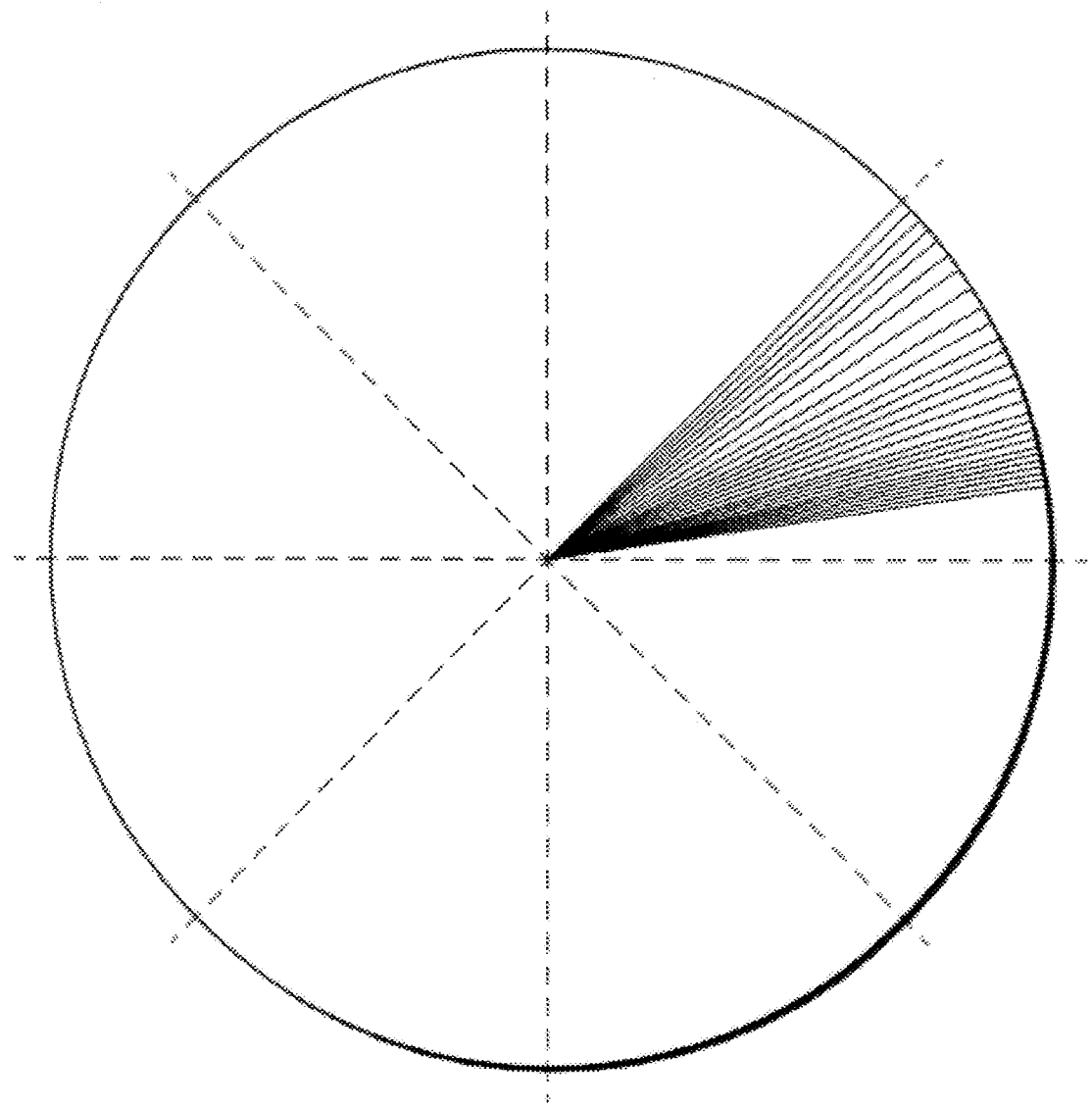
FIG. 9 is a graphical representation of a unit circle divided into quarters showing the density of the polynomials utilized to compute $\tan^{-1}(y,x)$, in accordance with the present invention.

FIG. 9 is a graphical representation of a unit circle divided into quarters showing the approximate density of polynomials which are required for calculating $\tan^{-1}$ (y,x) using the new implementation with M=3 and F=3. In contrast to FIG. 2 which showed a line for roughly every third polynomial, FIG. 9 shows a line for every polynomial needed. This illustrates that the number of polynomials and coefficients needed in the embodiment is much smaller than in the prior art.

Figure 10:
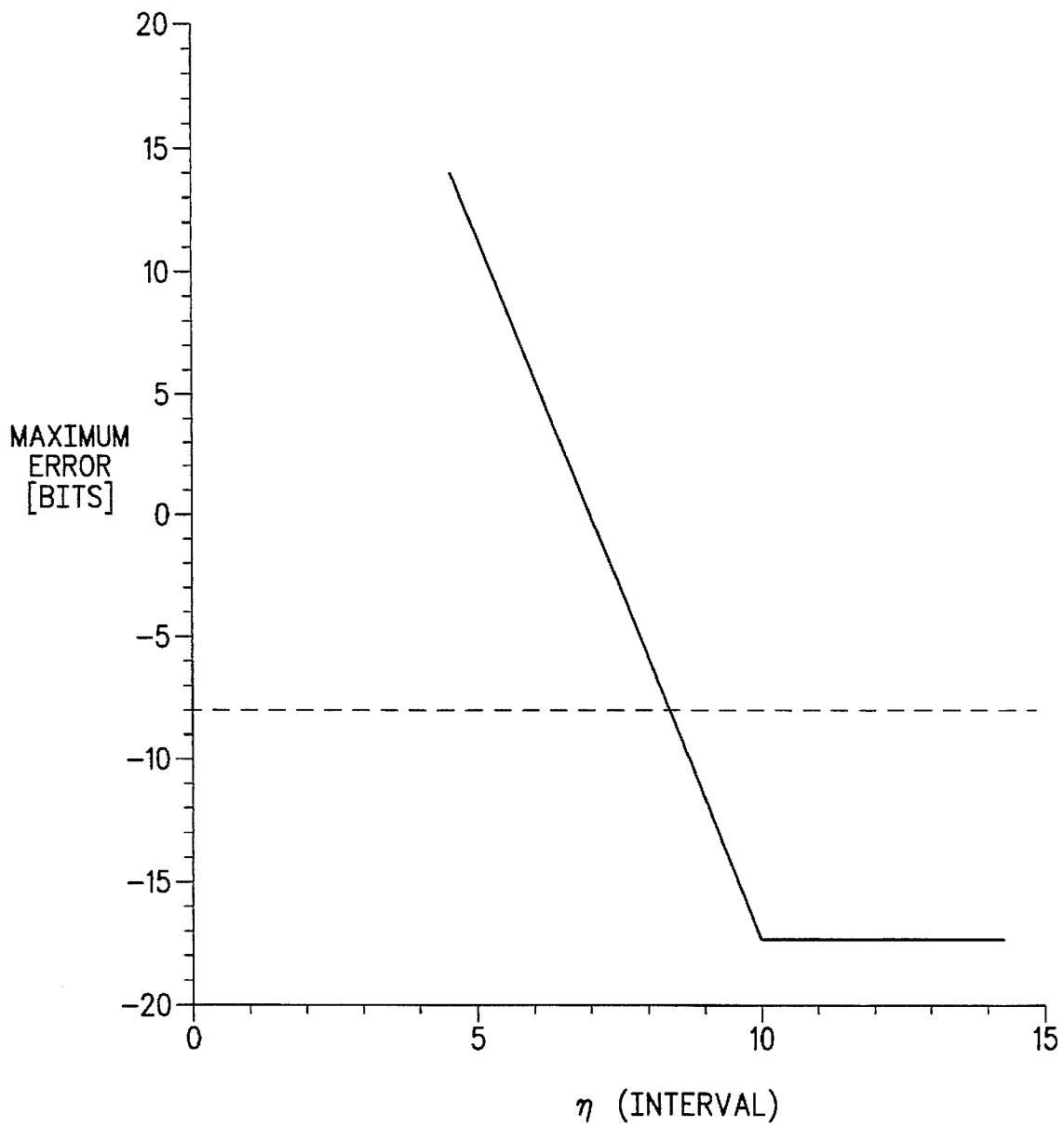
FIG. 10 is a graph showing the maximum relative error for polynomials with different numbers of coefficients utilized to compute $\tan^{-1}(s)$ in region A of FIG. 4 for M=2.
Figure 11:
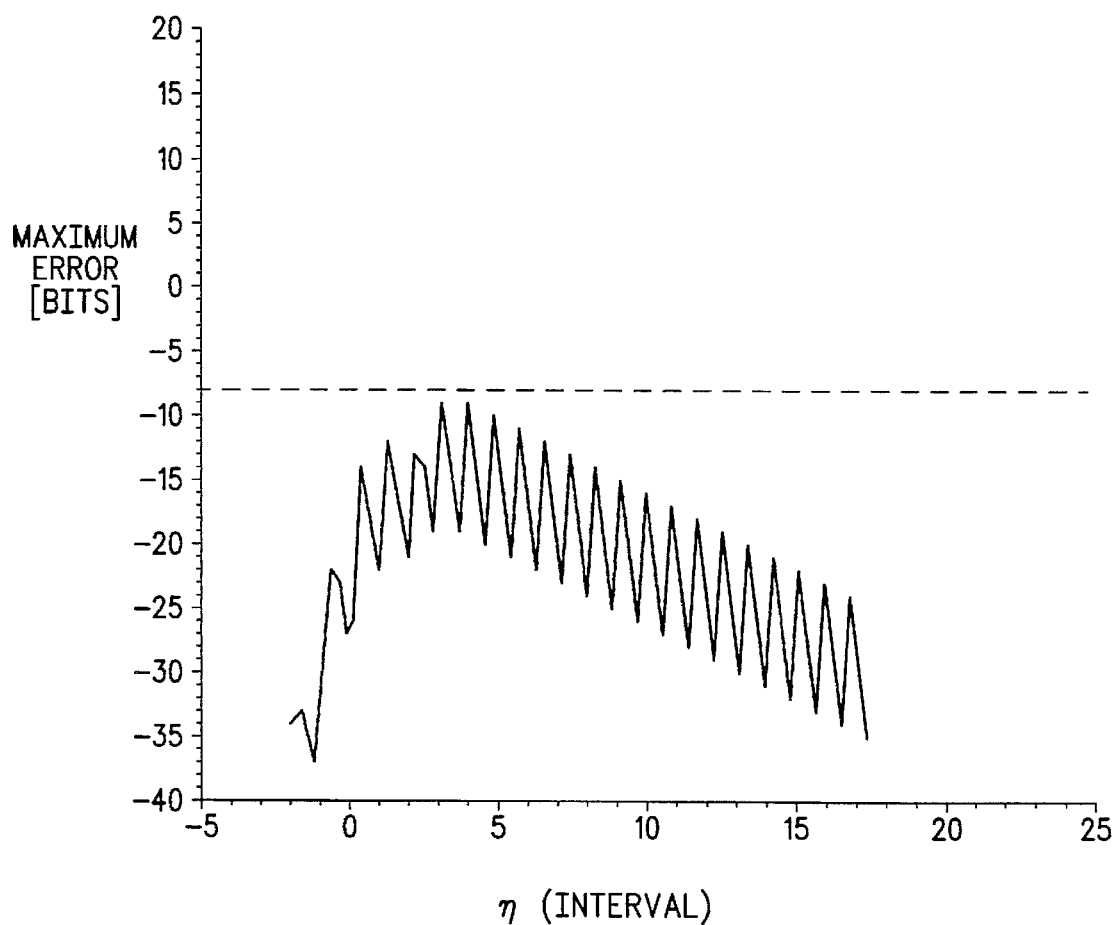
FIG. 11 is a graph showing the maximum absolute error for polynomials with 14 coefficients for each of the polynomials utilized to compute $\tan^{-1}(s)$ in region B of FIG. 4.

FIGS. 10–11 are graphs that show some of the analysis of minmax polynomials which was considered in designing particular implementations of the new method for computing $\tan^{-1}$ (s). FIG. 10 shows the maximum relative error for polynomials with different numbers of coefficients in the region A of FIG. 4 for M=2 The x-axis measures the number of coefficients in the polynomial. The units on the y-axis are the bit position, relative to the lowest bit position of the result, of the relative error. For example, an error of −11 indicates that the maximum error resulting from a mathematically exact evaluation of the best polynomial would give a maximum error of about $2^{-11}$ ulp. For the particular application, the optimal choice was 9 coefficients with an error of $2^{-11}$ ulp. FIG. 11 shows the maximum absolute error for polynomials with 14 coefficients for each of the polynomials needed for region B of FIG. 4 for M=2 and F=2. In this figure, the x-axis shows the index value "i" multiplied by $2^{-F}$, while the y-axis shows the same measure of error as FIG. 10. Curves for larger or smaller numbers of coefficients had smaller or larger errors, respectively, but the curves had similar shapes. It is seen from this figure that for a given number of polynomial coefficients, the worst case errors occur for medium values of s around 8 or 16, not much larger arguments.

Figure 12:
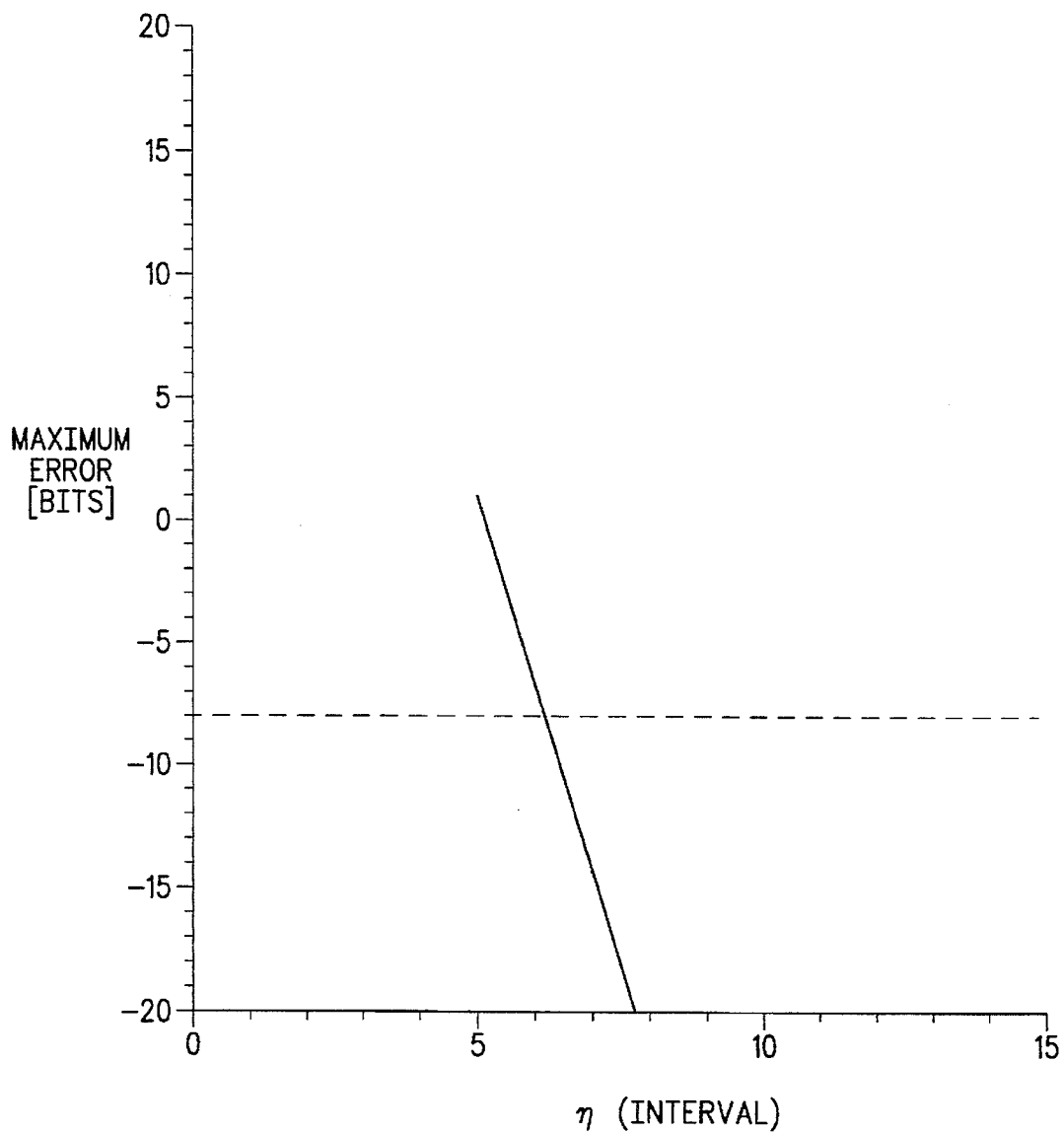
FIG. 12 is a graph showing the maximum relative error for polynomials with different numbers of coefficients when computing $\tan^{-1}(y,x)$ in region I of FIG. 7 for M=3.
Figure 13:
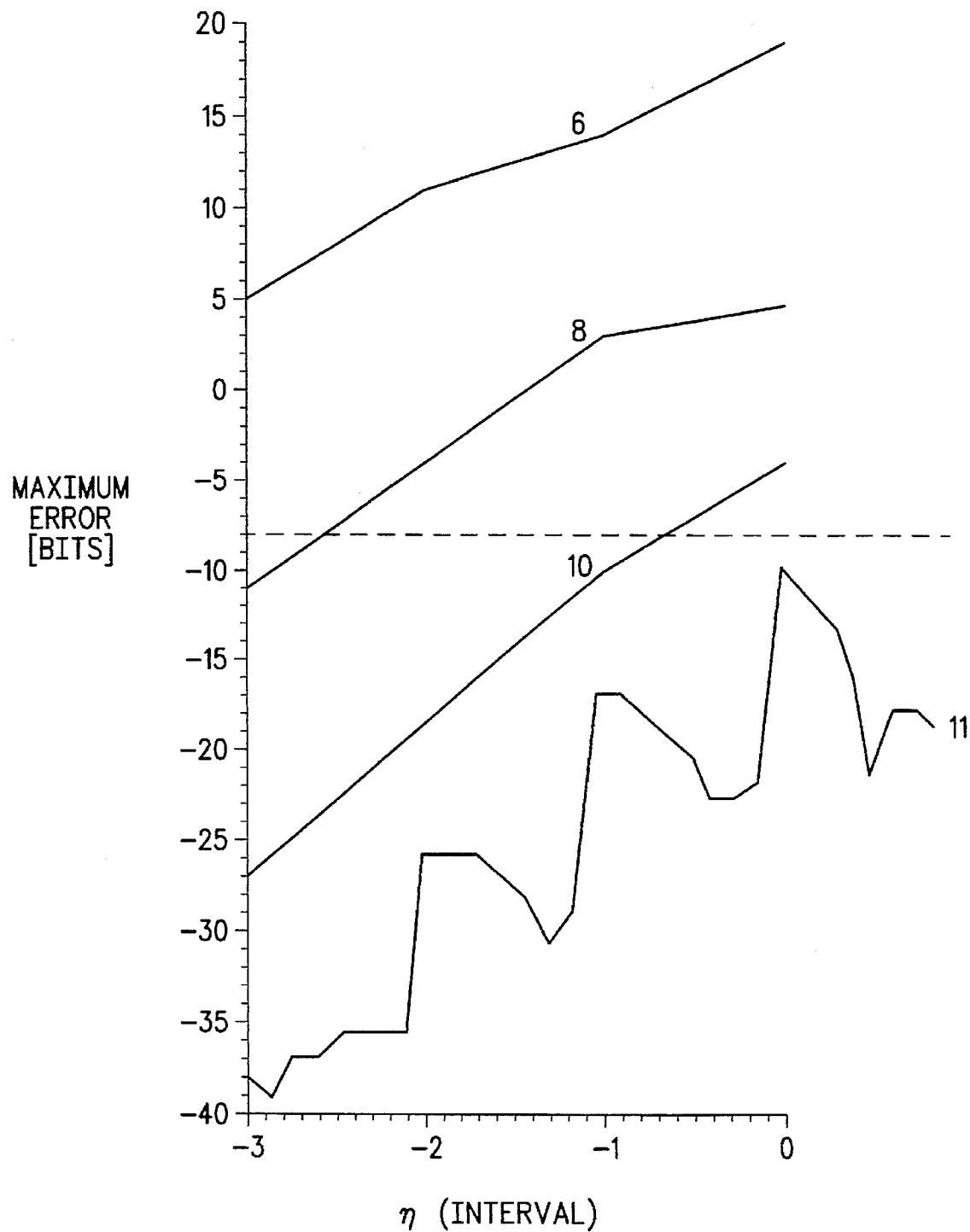
FIG. 13 is a graph showing the maximum absolute error for polynomials with 6, 8, 10, and 11 coefficients for each of the polynomials needed to compute $\tan^{-1}(y,x)$ in region IV of FIG. 7 for M=3 and F=3.

FIGS. 12–13 are graphs that show some of the analysis of minmax polynomials which was considered in designing particular implementations of the new method for computing $\tan^{-1}$ (y,x). FIG. 12 shows the maximum relative error for polynomials with different numbers of coefficients in the region I of FIG. 7 for M=3. The x-axis measures the number of coefficients in the polynomial. The y-axis represents the same measure of error as FIG. 10. For the particular application, the optimal choice was 7 coefficients with an error of $2^{-15}$ ulp. FIG. 13 shows the maximum absolute error for polynomials with 6, 8, 10, or 11 coefficients for each of the polynomials needed for region IV of FIG. 7 for M=3 and F=3. In this figure, the x-axis shows the index value "i" multiplied by $2^{-F}$, while the y-axis shows the same measure of error as FIG. 10. The curves for 6, 8, and 10 coefficients were not calculated at all points. For the particular implementation, the error threshold, shown as a dotted line, required 11 coefficients.

The remainder of the detailed description discloses at more depth the method disclosed hereinabove for reducing rounding error when evaluating binary floating point polynomials. The method was disclosed above for use in computing an Arctangent. However, this method is equally useful in computing other functions from their polynomial expansions. For example, it may be used to compute Arcsin ($\sin^{-1}$), Arccos ($\cos^{-1}$), hyperbolic functions, the error function, or the gamma function.

Often a polynomial:

$$P(v)=c_0+c_1*v+c_2*v^2+\ldots c_n*v^n \tag{30}$$

is used to approximate the value of a function f(x) over a range of an argument x where v is a linear function of x. In the simplest case, v=x, but in many circumstances it is also useful to let $v=x-x_0$ or some other linear function of x. The most general case to handle easily is where v is a linear function of x which can be computed exactly without rounding error in a given floating point representation. Typically, but not always, this involves multiplication by powers of 2 and subtractions of quantities with the same exponent.

If the arithmetic evaluating the polynomial could be done exactly, the requirement for a highly accurate approximation of the function f(x) by the polynomial P(v) over the interval would be determined by the goodness of the fit of the polynomial to the function over that interval. Depending on the accuracy requirements, this can be met in straightforward ways by fitting minmax polynomials with suitable weighting functions to the function over that interval.

When floating point arithmetic with rounding is used in evaluating the polynomial, rounding becomes a significant limitation to the accuracy of the polynomial evaluation. The final rounding cannot in general give a worst case error smaller than ½ ulp of the result, where an ulp (unit in last place) of any quantity is the value of the least significant bit of the floating point representation of that quantity. If the polynomial in EQ. (30) were evaluated in the most straightforward way, the final step would be adding $c_0$ to the sum of the remaining terms. The sum of the remaining terms would already have a rounding error which in general was no less than ½ ulp of the sum of the remaining terms, so the total error could be as large or larger than ½ ulp of the result plus ½ ulp of the sum of the remaining terms. The error could easily be larger. For example, if the sum of the remaining terms is computed by adding ($c_1*v$) to the sum ($c_2*v^2+\ldots +c_n*v^n$), there are additional rounding errors in the evaluation of ($c_1*v$) as well as in the sum ($c_2*v^2+\ldots +c_n*v^n$). This could possibly add another error of about ½ ulp of the sum of the remaining terms to the maximum possible rounding error. Even without this source of error, the extra rounding error, defined as the maximum rounding error introduced prior to the last floating operation, could be as large as ½ ulp of the sum of the remaining terms for this example.

In prior methods of approximating functions by polynomials, the extra rounding error was dominated by an error roughly proportional to ½ ulp of the term $c_1*v$. Given the actual constants $c_0$ and $c_1$, it was necessary to reduce the range of the polynomial expansion so that the maximum value of v would be small enough to reduce the extra rounding error to an acceptable size. As an example, the maximum size of the argument ranges used by Gal and Bachelis for calculating arctangents is imposed by this requirement. The problem which ensues with this means of reducing the extra rounding error is that by reducing the range, a very large number of polynomials are needed.

In the new method, the extra rounding error is reduced to be roughly proportional to 1 ulp of the term $c_2*v^2$. This is carried out by first expressing nearly exactly the combination $c_0+c_1*v$ as "big" + "small", and then evaluating the polynomial as:

$$P(v)=\text{big}+(\text{small}+c_2*v^2+\ldots +c_n*v^n) \tag{31}$$

The magnitude of the term in parentheses in EQ. (31) is in many cases $c_2*v^2$, and as a result the rounding error is proportional to 1 ulp in that quantity. Since $c_2*v^2$ is often much smaller than $c_1*v$, a given level of acceptable rounding error can often allow a much larger value of v and hence require far fewer ranges for polynomial evaluation.

There are many ways in which the decomposition of $c_0+c_1*v$ can be computed, of which two ways will be illustrated. The first assumes the existence of a multiply-add/subtract operation in which rounding is not performed until both the multiply and the add/subtract have been performed. Both methods are illustrated using brackets < > to indicate where rounding is performed.

In this case, the calculations performed are:

$t1=<c_1*v>$ $t2=<c_1*v-t1>$ $\text{big}=<c_0+t1>$ $t3=<\text{big}-c_0>$ $t4=<t3-t1>$ $\text{small}=<t2-t4> \tag{32}$ The second method assumes the existence of an operation to reduce the precision of a number to at most half the number of significant bits. This operation will be indicated by brackets [ ].

$t5=[c_1]$ $t6=[v]$ $t7=c_1-t5$ $t8=v-t6$ $t9=t5*t6$ $t10=<t7*v> \tag{33}$ $t11=t5*t8$ $t12=<t10+t11>$ $\text{big}=<c_0+t9>$ $t13=<(\text{big}-c_0)>$ $t14=<t13-t9>$ $\text{small}=<t12-t14>$ There are a number of natural modifications to these methods in which the details are changed slightly. These modifications will change the accuracy with which the final sum of "big + small" actually represents the true sum $c_0+c_1*v$, but without significantly affecting the extra rounding error. The methods, as written, assume that the $c_0$ term is larger in magnitude than the $c_1*v$ term. Minor variations are possible if that is definitely not the case or if that is not known to be the case. For many situations, the assumption is valid for the interesting range of the variable v.

Those skilled in the art will recognize that modifications and variations can be made without departing from the spirit of the invention. Therefore, it is intended that this invention encompass all such variations and modifications as fall within the scope of the appended claims.

I claim:

1. A method for determining an Arctangent of an Input Operand "S" ($\tan^{-1}$ (S)), wherein:

the Input Operand S is represented as a floating point number having a sign portion ("G"), an exponent portion ("E"), and a fraction portion ("F"), said method comprising the steps of:
a) issuing control signals to extract into a First Integer Register a first specified number bits from the least significant portion of exponent (E) and a second specified number of bits from the most significant portion of the fraction (F) to form an Index ("i"); and
b) in at least some instances, computing the Arctangent utilizing a Normal Operand Routine comprising the substeps of:
1) issuing control signals to a Data Processor to utilize the Index (i) stored in the First Integer Register to index into a Table of Polynomial Coefficients stored in a Memory, wherein:
said Polynomial Coefficient Table contains a plurality of Polynomial Coefficient Table Entries,
each said Polynomial Coefficient Table Entry comprises a plurality of Polynomial Coefficients ("$C^j_i$"),
said indexing into the Polynomial Coefficient Table identifies one of the plurality of Polynomial Coefficient Table Entries;
2) issuing control signals to the Data Processor to utilize the Index (i) stored in the First Integer Register to index into a Table containing Reference Values ($S_i$);
3) issuing control signals to a Floating Point Unit to compute a difference ("$|S|-S_i$") between an absolute value of the Input Operand (S) and the Reference Value ($S_i$); and
4) issuing control signals to the Floating Point Unit to compute an Arctangent result by performing floating point additions and multiplications utilizing said difference ($|S|-S_i$) and the coefficients ($C^j_i$), comprised in the identified Polynomial Coefficient Table Entry.

2. The method claimed in claim 1 wherein:
said method further comprising the steps of:
c) issuing control signals to an Integer Unit to perform one or more comparisons of the Index stored in the First Integer Register to one or more specified integers, wherein:
each of said comparisons compares said Index stored in the First Integer Register with a different one of said one or more specified integers, and
execution of each of said comparisons results in setting or clearing one or more condition codes; and
d) issuing control signals to a Branch Processing Unit to branch to one of a plurality of routines depending on the condition codes resulting from performing one or more of said comparisons, wherein:
at least one of said plurality of routines is the Normal Operand routine.

3. The method claimed in claim 2 wherein:
said method further comprising the steps of:
within step (d):
one of said plurality of routines is a Small Operand routine; and
said method further comprising:
e) when branching to said Small Operand routine, computation of the arctangent comprises the substeps of:
1) issuing control signals to the Floating Point Unit to compute the arctangent result by performing floating point additions and multiplications utilizing Independent Operand S and a single fixed plurality of Polynomial Coefficients.

4. The method claimed in claim 2 wherein:
within step (d):
one of said plurality of routines is a Very Small Operand routine; and
said method further comprising:
e) when branching to said Very Small Operand routine, the arctangent result is a linear function of Input Operand S.

5. The method claimed in claim 1 wherein within step (b):
within substep (1):
each Polynomial Coefficient Table Entry contains a Zeroth Order Coefficient, a First Order Coefficient and one or more Higher Order Coefficients,
said step (b) further comprising the substeps of:
5) issuing control signals to the Floating Point Unit to calculate a Big Part and a Small Part of a floating point difference between the Zeroth Order Coefficient and a floating point product of the First Order Coefficient and the difference ($|S|-S_i$);
6) issuing control signals to the Floating Point Unit to calculate a Product Of Sums of the Higher Order Coefficients in the identified Polynomial Coefficient Table Entry multiplied by integral powers of the difference ($|S|-S_i$);
7) issuing control signals to the Floating Point Unit to add the Small Part to the Product of Sums to form an Intermediate Sum, and
8) issuing control signals to the Floating Point Unit to add the Big Part to the Intermediate Sum.

6. The method claimed in claim 5 wherein within element (b) substep (5):
said Small Part is a floating point rounding error that occurs when calculating the Big Part with the Floating Point Unit.

7. The method claimed in claim 1 wherein within step (a):
the second specified number of bits is two.

8. A method for determining an Arctangent of an Input Operand "S" ($\tan^{-1}$ (S)), wherein:
the Input Operand S is represented as a floating point number having a sign portion ("G"), an exponent portion ("E"), and a fraction portion ("F"),
said method comprising the steps of:
a) issuing control signals to extract into a First Integer Register a first specified number bits from the least significant portion of exponent (E) and a second specified number of bits from the most significant portion of the fraction (F) to form an Index ("i");
b) issuing control signals to an Integer Unit to perform one or more comparisons of the Index stored in the First Integer Register to one or more specified integers, wherein:

each of said comparisons compares said Index stored in the First Integer Register with a different one of said one or more specified integers, and execution of each of said comparisons results in setting or clearing one or more condition codes;

c) issuing control signals to a Branch Processing Unit to branch to one of a plurality of routines depending on the condition codes resulting from performing one or more of said comparisons, wherein:

one of said plurality of routines is a Normal Operand routine, one of said plurality of routines is a Small Operand routine, and one of said plurality of routines is a Very Small Operand routine;

d) when branching to said Normal Operands routine, computation of the Arctangent comprises the substeps of:

1) issuing control signals to a Data Processor to utilize the Index (i) stored in the First Integer Register to index into a Table of Polynomial Coefficients stored in a Memory, wherein:

said Polynomial Coefficient Table contains a plurality of Polynomial Coefficient Table Entries, each said Polynomial Coefficient Table Entry comprises a plurality of Polynomial Coefficients ($"C^j_i"$), said indexing into the Polynomial Coefficient Table identifies one of the plurality of Polynomial Coefficient Table Entries;

2) issuing control signals to the Data Processor to utilize the Index (i) stored in the First Integer Register to index into a Table containing Reference Values ($S_i$);

3) issuing control signals to a Floating Point Unit to compute a difference ("$|S|-S_i$") between an absolute value of the Input Operand (S) and the Reference Value ($S_i$); and 4) issuing control signals to the Floating Point Unit to compute an Arctangent result by performing floating point additions and multiplications utilizing said difference ($|S|-S_i$) and the Polynomial Coefficients ($C^j_i$), comprised in the identified Polynomial Coefficient Table Entry;

e) when branching to said Small Operand routine, computation of the Arctangent comprises the substeps of:

1) issuing control signals to the Floating Point Unit to compute the Arctangent result by performing floating point additions and multiplications utilizing Independent Operand S and a plurality of Polynomial Coefficients; and f) when branching to said Very Small Operand routine, the Arctangent result is a linear function of Input Operand S.

9. The method claimed in claim 8 wherein:

within step (d) substep (1):

each Polynomial Coefficient Table Entry contains a Zeroth Order Coefficient, a First Order Coefficient and one or more Higher Order Coefficients, and said step (d) further comprises the substeps of:

5) issuing control signals to the Floating Point Unit to calculate a Big Part and a Small Part of a floating point difference between the Zeroth Order Coefficient and a floating point product of the First Order Coefficient and the difference ($|S|-S_i$);

6) issuing control signals to the Floating Point Unit to calculate a Product Of Sums of the Higher Order Coefficients in the identified Polynomial Coefficient Table Entry multiplied by integral powers of the difference ($|S|-S_i$);

7) issuing control signals to the Floating Point Unit to add the Small Part to the Product of Sums to form an Intermediate Sum, and 8) issuing control signals to the Floating Point Unit to add the Big Part to the Intermediate Sum.

10. An apparatus for determining an Arctangent of an Input Operand "S" ($\tan^{-1}$ (S)), wherein:

the Input Operand S is represented as a floating point number having a sign portion ("G"), an exponent portion ("E"), and a fraction portion ("F"), said apparatus comprising a) a means for issuing control signals to extract into a First Integer Register a first specified number bits from the least significant portion of exponent (E) and a second specified number of bits from the most significant portion of the fraction (F) to form an Index ("i"); and b) a Normal Operand means for computing the Arctangent comprising the subelements of:

1) a means for issuing control signals to a Data Processor to utilize the Index (i) stored in the First Integer Register to index into a Table of Polynomial Coefficients stored in a Memory, wherein:

said Polynomial Coefficient Table contains a plurality of Polynomial Coefficient Table Entries, each said Polynomial Coefficient Table Entry comprises a plurality of Polynomial Coefficients ($"C^j_i"$), said indexing into the Polynomial Coefficient Table identifies one of the plurality of Polynomial Coefficient Table Entries;

2) a means for issuing control signals to the Data Processor to utilize the Index (i) stored in the First Integer Register to index into a Table containing Reference Values ($S_i$);

3) a means for issuing control signals to a Floating Point Unit to compute a difference ("$|S|-S_i$") between an absolute value of the Input Operand (S) and the Reference Value ($S_i$); and 4) a means for issuing control signals to the Floating Point Unit to compute an Arctangent result by performing floating point additions and multiplications utilizing said difference ($|S|-S_i$) and the Polynomial Coefficients ($C^j_i$), comprised in the identified Polynomial Coefficient Table Entry.

11. The apparatus claimed in claim 11 wherein:

said apparatus further comprises:

c) a means for issuing control signals to an Integer Unit to perform one or more comparisons of the Index stored in the First Integer Register to one or more specified integers, wherein:

each of said comparisons compares said Index stored in the First Integer Register with a different one of said one or more specified integers, and execution of each of said comparisons results in setting or clearing one or more condition codes; and d) a means for issuing control signals to a Branch Processing Unit to select one of a plurality of means for computing the Arctangent depending on the condition codes resulting from performing one or more of said comparisons, wherein:

one of said plurality of means for computing the Arctangent is the Normal Operand means for computing the Arctangent.

12. The apparatus claimed in claim 11 wherein:
within element (d):
one of said plurality of means for computing the Arctangent is a Small Operand means for computing the Arctangent; and
said apparatus further comprising:
e) the Small Operand means for computing the Arctangent comprises:
1) a means for issuing control signals to the Floating Point Unit to compute the Arctangent result by performing floating point additions and multiplications utilizing Independent Operand S and a plurality of Polynomial Coefficients.

13. The apparatus claimed in claim 11 wherein:
within element (d):
one of said plurality of means for computating the Arctangent a Very Small Operand means for computating the Arctangent; and
said apparatus further comprises:
e) the Very Small Operand means for computating the Arctangent which comprises evaluating a linear function of Input Operand S.

14. The apparatus claimed in claim 10 wherein within element (b) subelement (1):
each Polynomial Coefficient Table Entry contains a Zeroth Order Coefficient, a First Order Coefficient and Higher Order Coefficients, and
said element (b) subelement (4) comprising the subsubelements of:
(a) a means for issuing control signals to the Floating Point Unit to calculate a Big Part and a Small Part of a floating point difference between the Zeroth Order Coefficient and a floating point product of the First Order Coefficient and the difference ($|S|-S_i$);
(b) a means for issuing control signals to the Floating Point Unit to calculate a Product Of Sums of the Higher Order Coefficients in the identified Polynomial Coefficient Table Entry multiplied by integral powers of the difference ($|S|-S_i$);
(c) a means for issuing control signals to the Floating Point Unit to add the Small Part to the Product of Sums to form an Intermediate Sum, and
(d) a means for issuing control signals to the Floating Point Unit to add the Big Part to the Intermediate Sum.

15. The apparatus claimed in claim 14 wherein within subelement (5) of element (b):
said Small Part is a floating point rounding error that occurs when calculating the Big Part with the Floating Point Unit.

16. The apparatus claimed in claim 10 wherein within element (a):
the second specified number of bits is two.

17. An apparatus for determining an arctangent of the quantities "x" and "y" ($\tan^{-1}(y,x)$) wherein:
the quantity x and the quantity y are represented as binary floating point numbers, each having a sign portion G, an exponent portion E, and a fraction portion F,
said apparatus comprising:
a) a means for issuing control signals to extract into a First Integer Register a first specified number bits from the least significant portion of exponent (E) and a second specified number of bits from the most significant portion of the fraction (F) from the quantity y to form a first exponent part;
b) a means for issuing control signals to extract into a Second Integer Register the first specified number bits from the least significant portion of exponent (E) and the second specified number of bits from the most significant portion of the fraction (F) from the quantity x to form a second exponent part;
c) a means for issuing control signals to compare the magnitude of the quantity x with the magnitude of the quantity y wherein:
either the quantity x or the quantity y is determined to be a Larger Quantity, and the other of the quantity x or the quantity y is determined to be a Smaller Quantity;
d) a means for issuing control signals to an Integer Unit to subtract into a third integer register one of said exponent parts from the other of said exponent parts to form an Exponent Difference;
e) a means for issuing control signals to an Integer Unit to perform one or more comparisons of an Index to one or more specified integers, wherein:
each of said comparisons compares said Index with a different one of said one or more specified integers, and
execution of each of said comparisons results in setting or clearing one or more condition codes; and
f) a Normal Operand means for computing the Arctangent comprising the subelements of:
1) a means for issuing control signals to a Floating Point Unit to form the reciprocal of the larger quantity, wherein:
the smaller quantity is a Numerator, and
the reciprocal of the larger quantity is an Inverted Denominator;
2) a means for issuing control signals to the Floating Point Unit to multiply the Numerator and the Inverted Denominator to form a Combined Operand,
3) a means for issuing control signals to a Data Processor to extract into a fourth integer register a third specified number of bits of the least significant portion of the exponent E and a fourth specified number bits of the most significant portion of the fraction portion F from the Combined Operand to form an Index,
4) a means for issuing control signals to the Data Processor to index into a Table of Polynomial Coefficients stored in a Memory utilizing said Index, wherein:
said Polynomial Coefficient Table contains a plurality of Polynomial Coefficient Table Entries,
each said Polynomial Coefficient Table Entry comprises a plurality of Polynomial Coefficients,
said indexing into the polynomial coefficient table identifies one of the plurality of Polynomial Coefficient Table Entries; and
5) a means for issuing control signals to a Floating Point Unit to compute the Arctangent result by performing floating point additions and multiplications utilizing the Combined Operand and the Polynomial Coefficients comprised in the identified Polynomial Coefficient Table Entry.

18. The apparatus claimed in claim 17 which further comprises:
f) a means for issuing control signals to a Branch Processing Unit to select one of a plurality of Means for Computing the Arctangent depending on the condition codes resulting from performing one or more of said comparisons, wherein:

at least one of said plurality of Means for Computing the Arctangent is the Normal Operand means of computing Arctangent.

19. The apparatus claimed in claim 18 wherein:

within element (f):

at least one of said plurality of Means for Computing the Arctangent is a Small Operand means of computing Arctangent, and said apparatus further comprising:

h) the Small Operand means of computing Arctangent comprising the subelements of:
  1) a means for issuing control signals to the Floating Point Unit to form the reciprocal of the larger quantity, wherein:
     the smaller quantity is a numerator, and
     the reciprocal of the larger quantity is an inverted denominator;
  2) a means for issuing control signals to the Floating Point Unit to multiply the numerator and the inverted denominator to form a Combined Operand, and
  3) a means for issuing control signals to the Floating Point Unit to compute the arctangent result by performing floating point additions and multiplications utilizing the Combined Operand and a plurality of Polynomial Coefficients.

20. A method for determining an arctangent of the quantities "x" and "y" ($\tan^{-1}$ (y,x)) wherein:

the quantity x and the quantity y are represented as binary floating point numbers, each having a sign portion G, an exponent portion E, and a fraction portion F, said method comprising the steps of:

a) issuing control signals to extract into a First Integer Register a first specified number bits from the least significant portion of exponent (E) and a second specified number of bits from the most significant portion of the fraction (F) from the quantity y to form a first exponent part;

b) issuing control signals to extract into a Second Integer Register the first specified number bits from the least significant portion of exponent (E) and the second specified number of bits from the most significant portion of the fraction (F) from the quantity x to form a second exponent part;

c) issuing control signals to compare the magnitude of the quantity x with the magnitude of the quantity y wherein:
  either the quantity x or the quantity y is determined to be a Larger Quantity, and the other of the quantity x or the quantity y is determined to be a Smaller Quantity;

d) issuing control signals to an Integer Unit to compute an Index(i) stored in a third integer register, wherein:
  the Index is roughly a logarithmic function of the quotient of the Smaller Quantity divided by the Larger Quantity;

e) issuing control signals to an Integer Unit to perform one or more comparisons to one or more specified integers of a first difference between one of said First and Second Exponent Parts from the other of said First and Second Exponent Parts, wherein:
  each of said comparisons compares said first difference with a different one of said one or more specified integers, and
  execution of each of said comparisons results in setting or clearing one or more condition codes; and f) in at least some instances, computing the Arctangent utilizing a Normal Operand Routine comprising the substeps of:
  1) issuing control signals to a Floating Point Unit to form the reciprocal of the Larger Quantity, wherein:
     the Smaller Quantity is a Numerator, and
     the reciprocal of the Larger Quantity is an inverted denominator;
  2) issuing control signals to the Floating Point Unit to multiply the Numerator and the Inverted Denominator to form a Combined Operand,
  3) issuing control signals to a Data Processor to index into a Table of Polynomial Coefficients stored in a Memory utilizing said Index, wherein:
     said Polynomial Coefficient Table contains a plurality of Polynomial Coefficient Table Entries,
     each said Polynomial Coefficient Table Entry comprises a plurality of Polynomial Coefficients,
     said indexing into the Polynomial Coefficient Table identifies one of the plurality of Polynomial Coefficient Table Entries; and
  4) issuing control signals to a Floating Point Unit to compute the Arctangent result by performing floating point additions and multiplications utilizing the Combined Operand and the Polynomial Coefficients comprised in the identified Polynomial Coefficient Table Entry.

21. The method claimed in claim 20 which further comprises:

g) issuing control signals to a Branch Processing Unit to branch to one of a plurality of routines depending on the condition codes resulting from performing one or more of said comparisons, wherein:
  at least one of said plurality of routines is the Normal Operand routine.

22. The method claimed in claim 20 wherein:

within step (f):

one or more of said plurality of routines are Small Operand routines, and said method further comprising:

h) when branching to any of the Small Operand routines, computation of the arctangent comprises the substeps of:
  1) issuing control signals to the Floating Point Unit to form the reciprocal of the larger quantity, wherein:
     the smaller quantity is a Numerator, and
     the reciprocal of the larger quantity is an Inverted Denominator;
  2) issuing control signals to the Floating Point Unit to multiply the Numerator and the Inverted Denominator to form a Combined Operand,
  3) issuing control signals to the Floating Point Unit to compute the Arctangent result by performing floating point additions and multiplications utilizing the Combined Operand and a plurality of Polynomial Coefficients.

23. The method claimed in claim 20 wherein step (d) comprises the substeps of:
  1) issuing control signals to extract into the third integer register a third specified number of bits from the least significant portion of exponent (E) and a third specified number of bits from the most significant portion of the fraction (F) from the floating point quotient of the Smaller Quantity divided by the Larger Quantity.

24. The method claimed in claim 20 wherein step (d) comprises the substeps of:

1) issuing control signals to the Data Processor to extract into a Fourth Integer Register a third specified number of bits from the most significant portion of the fraction (F) from the Smaller Quantity to form a First Fraction Part;
2) issuing control signals to the Data Processor to extract into a Fifth Integer Register a fourth specified number of bits from the most significant portion of the fraction (F) from the Larger Quantity to form a Second Fraction Part;
3) issuing control signals to the Integer Unit to combine the First Fraction Part with the Second Fraction Part to form a Preindex;
4) issuing control signals to utilize the Preindex to index into a Preindex Table selecting a Preindex Table Entry; and
5) issuing control signals to the Integer Unit to combine a value stored at the selected Preindex Table Entry with a difference between one of the First and Second Exponent Parts and the other of the First and Second Exponent Parts to form the Index stored in the Third Integer Register.

25. The method claimed in claim 20 wherein within step (f): within substep (3):

each Polynomial Coefficient Table Entry contains a Zeroth Order Coefficient, a First Order Coefficient and one or more Higher Order Coefficients, and step (f) substep (4) comprises the subsubsteps of:

(a) issuing control signals to the Data Processor to select a Selected Reference Value by utilize the Index(i) stored in the Third Integer Register to index into a Table containing Reference Values;

(b) issuing control signals to the Floating Point Unit to calculate a Reference Difference ($|R|-R_i$) between the absolute value of the Combined Operand ($|R|$) minus the Selected Reference Value ($R_i$);

(c) issuing control signals to the Floating Point Unit to calculate a Big Part and a Small Part of a floating point difference between the Zeroth Order Coefficient and a floating point product of the First Order Coefficient and the Reference Difference ($|R|-R_i$);

(d) issuing control signals to the Floating Point Unit to calculate a Product Of Sums of the Higher Order Coefficients in the identified Polynomial Coefficient Table Entry multiplied by integral powers of the Reference Difference ($|R|-R_i$);

(e) issuing control signals to the Floating Point Unit to add the Small Part to the Product of Sums to form an Intermediate Sum, and (f) issuing control signals to the Floating Point Unit to add the Big Part to the Intermediate Sum.

26. The method claimed in claim 25 wherein within step (f) substep (4) subsubstep (c):

said Small Part is a floating point rounding error that occurs when calculating the Big Part with the Floating Point Unit.

27. The method claimed in claim 20 wherein within step (a):

the first and second specified number of bits are three.

28. A method for determining an arctangent of the quantities "x" and "y" ($\tan^{-1}(y,x)$) wherein:

the quantity x and the quantity y are represented as binary floating point numbers, each having a sign portion G, an exponent portion E, and a fraction portion F, said method comprising the steps of:

a) issuing control signals to extract into a First Integer Register a first specified number bits from the least significant portion of exponent (E) and a second specified number of bits from the most significant portion of the fraction (F) from the quantity y to form a first exponent part;

b) issuing control signals to extract into a Second Integer Register the first specified number bits from the least significant portion of exponent (E) and the second specified number of bits from the most significant portion of the fraction (F) from the quantity x to form a second exponent part;

c) issuing control signals to compare the magnitude of the quantity x with the magnitude of the quantity y wherein:

either the quantity x or the quantity y is determined to be a Larger Quantity, and the other of the quantity x or the quantity y is determined to be a Smaller Quantity;

d) issuing control signals to an Integer Unit to compute an Index(i) stored in a third integer register, wherein:

the Index is roughly a logarithmic function of the quotient of the Smaller Quantity divided by the Larger Quantity, said step(d) comprising the substep of:

1) issuing control signals to extract into the third integer register a third specified number of bits from the least significant portion of exponent (E) and a third specified number of bits from the most significant portion of the fraction (F) from the floating point quotient of the Smaller Quantity divided by the Larger Quantity;

e) issuing control signals to an Integer Unit to perform one or more comparisons to one or more specified integers of a first difference between one of said First and Second Exponent Parts from the other of said First and Second Exponent Parts, wherein:

each of said comparisons compares said first difference with a different one of said one or more specified integers, and execution of each of said comparisons results in setting or clearing one or more condition codes;

f) issuing control signals to a Branch Processing Unit to branch to one of a plurality of routines depending on the condition codes resulting from performing one or more of said comparisons, wherein:

one or more of said plurality of routines are Normal Operand routines;

one or more of said plurality of routines are Small Operand routines, and g) when branching to any of Normal Operand Routines, computation of the Arctangent comprises the substeps of:

1) issuing control signals to a Floating Point Unit to form the reciprocal of the Larger Quantity, wherein:

the Smaller Quantity is a Numerator, and the reciprocal of the Larger Quantity is an inverted denominator;

2) issuing control signals to the Floating Point Unit to multiply the Numerator and the Inverted Denominator to form a Combined Operand, 3) issuing control signals to a Data Processor to index into a Table of Polynominal Coefficients stored in a Memory utilizing said Index, wherein:

said Polynomial Coefficient Table contains a plurality of polynomial Coefficient Table Entries, each said Polynomial Coefficient Table Entry comprises a plurality of Polynomial Coefficients, said indexing into the Polynomial Coefficient Table identifies one of the plurality of Polynomial Coefficient Table Entries; and 4) issuing control signals to a Floating Point Unit to compute the Arctangent result by performing floating point additions and multiplications utilizing the Combined Operand and the Polynomial Coefficients comprised in the identified Polynomial Coefficient Table Entry; and h) when branching to any of the Small Operand routines, computation of the arctangent comprises the substeps of:

1) issuing control signals to the Floating Point Unit to form the reciprocal of the larger quantity, wherein:
the smaller quantity is a Numerator, and
the reciprocal of the larger quantity is an Inverted Denominator;

2) issuing control signals to the Floating Point Unit to multiply the Numerator and the Inverted Denominator to form a Combined Operand, and 3) issuing control signals to the Floating Point Unit to compute the Arctangent result by performing floating point additions and multiplications utilizing the Combined Operand and a plurality of Polynomial Coefficients.

29. An apparatus for determining an Arctangent of an Input Operand "S" ($\tan^{-1}$ (S)), wherein:

the Input Operand S is represented as a floating point number having a sign portion ("G"), an exponent portion ("E"), and a fraction portion ("F"), said apparatus comprising:

a) a Data Processor comprising:
1) an Integer Unit,
2) a Floating Point Unit,
3) a Branch Processing Unit, and
4) a Memory;

b) said Data Processor programmed to extract into a First Integer Register a first specified number bits from the least significant portion of exponent (E) and a second specified number of bits from the most significant portion of the fraction (F) to form an Index ("i");

c) said Data Processor programmed to compute in at least some instances a Normal Operand Routine which comprises the subelements of:

1) said Data Processor programmed to utilize the Index (i) stored in the First Integer Register to index into a Table of Polynomial Coefficients stored in the Memory, wherein:
said Polynomial Coefficient Table contains a plurality of Polynomial Coefficient Table Entries,
each said Polynomial Coefficient Table Entry comprises a plurality of Polynomial Coefficients ("$C^j_i$"),
said indexing into the Polynomial Coefficient Table identifies one of the plurality of Polynomial Coefficient Table Entries;

2) said Data Processor programmed to utilize the Index (i) stored in the First Integer Register to index into a Table containing Reference Values ($S_i$);

3) said Data Processor programmed to compute a difference ("$|S|-S_i$") between an absolute value of the Input Operand (S) and the Reference Value ($S_i$); and 4) said Data Processor programmed to compute an Arctangent result by performing floating point additions and multiplications utilizing said difference ($|S|-S_i$) and the Polynomial Coefficients ($C^j_i$), comprised in the identified Polynomial Coefficient Table Entry.

30. A method for determining an Arctangent of an Input Operand "S" ($\tan^{-1}$ (S)), wherein:

the Input Operand S is represented as a floating point number having a sign portion ("G"), an exponent portion ("E"), and a fraction portion ("F"), said method comprising the steps of:

a) extracting into a First Integer Register a first specified number bits from the least significant portion of exponent (E) and a second specified number of bits from the most significant portion of the fraction (F) to form an Index ("i"); and b) in at least some instances ("Normal Operands"), computation of the Arctangent comprises the substeps of:

2) using the Index (i) stored in the First Integer Register to index into a Polynomial Coefficient Table stored in a Memory, wherein:
said Polynomial Coefficient Table contains a plurality of Polynomial Coefficient Table Entries,
each of the plurality of Polynomial Coefficient Table Entries comprises a plurality of Polynomial Coefficients ("$C^j_i$"),
said indexing into the Polynomial Coefficient Table identifies one of the plurality of Polynomial Coefficient Table Entries as an identified Polynomial Coefficient Table Entry; and 2) computing an Arctangent result by performing floating point additions and multiplications evaluating a polynomial formed from the plurality of Polynomial Coefficients in the identified Polynomial Coefficient Table Entry multiplied by integer powers of a linear function of the Input Operand (S).

\* \* \* \* \*

UNITED STATES PATENT AND TRADEMARK OFFICE
CERTIFICATE OF CORRECTION

PATENT NO: 5,648,924

DATED: April 17, 1995

INVENTORS: Roger A. Smith

It is certified that an error appears in the above-identified patent and that said Letters Patent is hereby corrected as shown below:

Column 20, line 49, change "claim 11" to --claim 10--

Signed and Sealed this

Nineteenth Day of May, 1998

Attest:

BRUCE LEHMAN

Attesting Officer      Commissioner of Patents and Trademarks